US008259848B2

(12) United States Patent
Malladi

(10) Patent No.: US 8,259,848 B2
(45) Date of Patent: Sep. 4, 2012

(54) HIERARCHICAL MODULATION FOR COMMUNICATION CHANNELS IN SINGLE-CARRIER FREQUENCY DIVISION MULTIPLE ACCESS

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1107 days.

(21) Appl. No.: 12/135,793

(22) Filed: Jun. 9, 2008

(65) Prior Publication Data

US 2009/0042511 A1 Feb. 12, 2009

Related U.S. Application Data

(60) Provisional application No. 60/942,980, filed on Jun. 8, 2007.

(51) Int. Cl.
H04L 27/36 (2006.01)
(52) U.S. Cl. ........ 375/298; 375/260; 375/295; 375/299; 375/302; 375/322
(58) Field of Classification Search .................. 375/260, 375/261, 267, 269, 271, 295, 297, 298, 299, 375/302, 316, 322, 340, 346
See application file for complete search history.

(56) References Cited

U.S. PATENT DOCUMENTS

| 5,852,630 | A  | * | 12/1998 | Langberg et al. ............. 375/219 |
| 7,274,653 | B1 | * | 9/2007  | Settle et al. ................... 370/206 |
| 7,903,575 | B2 | * | 3/2011  | Yoon et al. .................... 370/252 |
| 8,116,412 | B1 | * | 2/2012  | Jia et al. ........................ 375/343 |
| 2006/0178755 | A1 |   | 8/2006  | Ling et al. |
| 2006/0203924 | A1 | * | 9/2006  | Casaccia et al. ............. 375/260 |
| 2008/0025241 | A1 | * | 1/2008  | Bhushan et al. ............. 370/312 |
| 2008/0025323 | A1 | * | 1/2008  | Khan ............................. 370/400 |
| 2008/0084844 | A1 | * | 4/2008  | Reznik et al. ................. 370/330 |
| 2008/0159186 | A1 | * | 7/2008  | Steer ............................. 370/297 |
| 2008/0200114 | A1 | * | 8/2008  | Eberlein et al. ............. 455/3.02 |

FOREIGN PATENT DOCUMENTS

JP 2007502086 A 2/2007
(Continued)

OTHER PUBLICATIONS

International Search Report, PCT/US08/066347, International Search Authority, European Patent Office, Nov. 17, 2008.

(Continued)

*Primary Examiner* — Shuwang Liu
*Assistant Examiner* — Hirdepal Singh
(74) *Attorney, Agent, or Firm* — Kenneth Vu

(57) ABSTRACT

System(s) and method(s) are provided to transmit simultaneously a first and a second communication channel in a single-carrier waveform format with disparate error rate requirements. First channel and second channel are coded individually to form an alphabet for a first and second constellation. Prior to transmission, bits of information of the first and second channels are modulated with a hierarchical modulation constellation is generated through a combination of a first a second constellation; each constellation is assigned a configurable weight (e.g., a "hierarchic weight") that is expressed in terms of a configurable energy ratio. The energy ratio determines the resilience of bits associated with the first and second channel. Bit mapping within the first and second constellation provides redundancy to mitigate error rate within each quadrant of the hierarchical constellation. Hierarchical modulation of more than two channel can be accomplished through the same principal of individual coding and constellation composition.

29 Claims, 14 Drawing Sheets

FOREIGN PATENT DOCUMENTS

| | | |
|---|---|---|
| JP | 2008527931 | 7/2008 |
| WO | 04105337 | 12/2004 |
| WO | 05029737 | 3/2005 |

OTHER PUBLICATIONS

Written Opinion, PCT/US08/066347, International Search Authority, European Patent Office, Nov. 17, 2008.

Fazel et al., "A Concept of Digital Terrestrial Television Broadcasting," Wireless Personal Communications, Jan. 1, 1995, pp. 9-27, vol. 2, No. 1/02, Springer, Dordrecht NL, XP000589609.

Hossain et al, "Multi-User Opportunistic Scheduling using Power Controlled Hierarchical Constellations," IEEE Transactions on Wireless Communications, May 1, 2007, pp. 1581-1586, vol. 6, No. 5; IEEE Service Center, Piscataway, NJ, USA, XP011181419.

\* cited by examiner

HIERARCHICAL MODULATION FOR COMMUNICATION CHANNELS IN SINGLE-CARRIER FREQUENCY DIVISION MULTIPLE ACCESS

CLAIM OF PRIORITY UNDER 35 U.S.C. §119

This application for patent claims the benefit of U.S. Provisional Application Ser. No. 60/942,980 filed on Jun. 8, 2007, and entitled "HIERARCHICAL MODULATION BASED CONTROL CHANNEL FOR SC-FDMA." The entirely of this application is expressly incorporated herein by reference.

BACKGROUND

I. Field

The following description relates generally to wireless communications and, more particularly, to hierarchical modulation of multiple communication channels simultaneously conveyed through a single carrier.

II. Background

Wireless communication systems have become a nearly ubiquitous means for communication of both voice and data, e.g., video and audio streams, file transfers, web-browsing, and so on. Emergence of new markets for wireless communication, increased complexity of subscriber needs, and competition among network operators have driven substantial development of wireless technologies at the user equipment and network level. Such development has synergistically benefited from a steady development of computing capabilities, or processing power, and miniaturization of computing units.

Wireless communication systems are widely deployed to provide various types of communication content such as voice, data, and so on. These systems may be multiple-access systems capable of supporting communication with multiple users by sharing the available system resources (e.g., bandwidth and transmit power, which typically are finite, regulated and costly resources). Examples of such multiple-access systems include code division multiple access (CDMA) systems; time division multiple access (TDMA) systems; frequency division multiple access (FDMA) systems and orthogonal frequency division multiple access (OFDMA) systems, and space division multiple access (SDMA). Third generation systems like 3rd Generation Partnership Project 2 Ultra Mobile Broadband (UMB) and 3rd Generation Partnership Project Long Term Evolution (LTE) systems exploit one or more of the such multiple-access paradigms.

In advanced wireless architectures, multiple access paradigms have benefited from multiple-input multiple-output mode of communication, which effect telecommunication via multiple transceivers in either a serving access terminal or a receiver, or both devices. In addition, multiplexing of traffic and signal generally relies on Frequency Division Multiplexing (FDM) which is specified differently in downlink than in uplink; while DL utilizes multiple carriers for communication, uplink employs a single carrier (SC) or single-carrier waveform. SC-FDMA provides substantially all advantages on FDM while mitigating peak-to-average ratio (PAPR) fluctuations. Such solution arises at the expense of a somewhat more complex and multiplexing for UL transport and signaling channels: Channels are to be multiplexed in contiguous tones or equally interleaved tones systems exploit single-carrier waveform transport traffic and control. Furthermore, under specific circumstances two channels are required to be transmitted to retain a communication e.g., a voice or data session, while preserving a subscriber perceived quality of service, to ensure communication is indeed preserved in such instances, various approaches to UL transmission have utilized like joint coding, time-division multiplexing of information, individual coding with multiple Zadoff-Chu sequences. Yet those approaches appear to provide far from complete, effective solutions to the problem of simultaneous multiple channel transmission.

Therefore there is a need for a transmission formalism for communication of multiple communication channels with SC-FDMA waveform.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The subject innovation provides system(s) and method(s) to transmit simultaneously a plurality of communication channels with disparate error rate requirements in a single-carrier waveform format. A first channel and a second channel are coded individually to form an alphabet for a first and a second constellation. Prior to transmission, P bits (P a positive integer) of information of the first channel and Q bits (Q a positive integer) of the second channel are modulated with a hierarchical modulation constellation generated through a combination of the first a second constellation; each constellation is assigned a configurable weight (e.g., a "hierarchic weight") that is expressed in terms of a configurable energy ratio. The energy ratio determines the resilience of bits associated with the first and second channel. Bit mapping within the first and second constellation provides redundancy to mitigate error rate within each quadrant of the hierarchical constellation. Hierarchical modulation of more than two channel can be accomplished through the same principal of individual coding and constellation composition.

In an aspect of the subject innovation, a method employed in a wireless communication system is described, the method comprising: encoding P bits (P a positive integer) of information of a first communication channel in a first modulation constellation; encoding Q bits (Q a positive integer) of information of a second communication channel in a second modulation constellation; combining the encoded first modulation constellation and the encoded second modulation constellation to generate a hierarchical modulation constellation; and modulating the first communication channel and the second communication channel in a common set of tones with the hierarchical modulation constellation.

In another aspect, the innovation describes a wireless communication device comprising: a processor configured to encode P bits (P a positive integer) of information of a first communication channel in a first modulation constellation; to encode Q bits (Q a positive integer) of information of a second communication channel in a second modulation constellation; to assign a first weight to the first encoded constellation and a second weight to the second encoded constellation to generate a hierarchical modulation constellation through the combination of the weighted first encoded constellation and the weighted second encoded constellation; and to modulate the first communication channel and the second communication channel in a common set of tones with the hierarchical modulation constellation; and a memory coupled to the processor.

In yet another aspect, the subject innovation discloses an apparatus that operates in a wireless communication environment, the apparatus comprising: means for encoding a first set of bits of information of a first communication channel in a first modulation constellation; means for encoding a second set of bits of information of a second communication channel in a second modulation constellation; means for assigning a first weight to the first encoded constellation and a second weight to the second encoded constellation to generate a hierarchical modulation constellation through the combination of the weighted first encoded constellation and the weighted second encoded constellation; means for modulating the first communication channel and the second communication channel in a common set of tones with the hierarchical modulation constellation; and means for conveying the hierarchically modulated first communication channel and second communication channel.

In a further yet aspect, the innovation describes a computer program product comprising a computer-readable medium including: code for causing at least one computer to encode P bits (P a positive integer) of a first communication channel in a first layer of a modulation constellation symbol; code for causing at least one computer to encode Q bits (Q a positive integer) of a second communication channel in a second layer of a modulation constellation symbol; code for causing at least one computer to generate a hierarchical modulation constellation symbol through a weighted combination of the encoded first layer of a modulation constellation symbol and the encoded second layer of a modulation constellation; and code for causing at least one computer to modulate the first communication channel and the second communication channel in a common set of tones with a set of hierarchical modulation constellation symbols.

In another aspect, the subject disclosure describes a method utilized in wireless communications, the method comprising: receiving a first communication channel and a second communication channel that are hierarchically modulated in a composed layer; wherein the composed layer includes a first layer and a second layer; decoding the first layer; and decoding the second layer via at least one of a serial decoding subsequent to decoding the first layer or a parallel decoding concurrent with decoding the first layer.

In yet another aspect, the subject innovation describes an apparatus that operates in a wireless communication system, the apparatus comprising: means for decoding a first layer of information bits of a first communication channel and a second communication channel hierarchically modulated; and means for decoding a second layer serially after decoding the first layer, wherein decoding the second layer includes means for cancelling soft symbols decoded in the first layer.

In a further yet aspect, the innovation describes an electronic device that operates in a wireless environment, the electronic device comprising: a processor configured to decode a first layer of information bits of a first communication channel and a second communication channel hierarchically modulated; and to decode a second layer serially after decoding the first layer, wherein decoding the second layer includes means for cancelling soft symbols decoded in the first layer; an a memory coupled to the processor.

In a still further aspect, the innovation describes a computer program product comprising a computer-readable medium including: code for causing at least one computer to receive a first communication channel and a second communication channel that are hierarchically modulated in a composed layer; wherein the composed layer includes a first layer and a second layer; code for causing at least one computer to decode the first layer; and code for causing at least one computer to decode the second layer via at least one of a serial decoding subsequent to decoding the first layer or a parallel decoding concurrent with decoding the first layer, wherein a serial decoding subsequent to decoding the first layer includes cancelling soft symbols after decoding the first layer.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
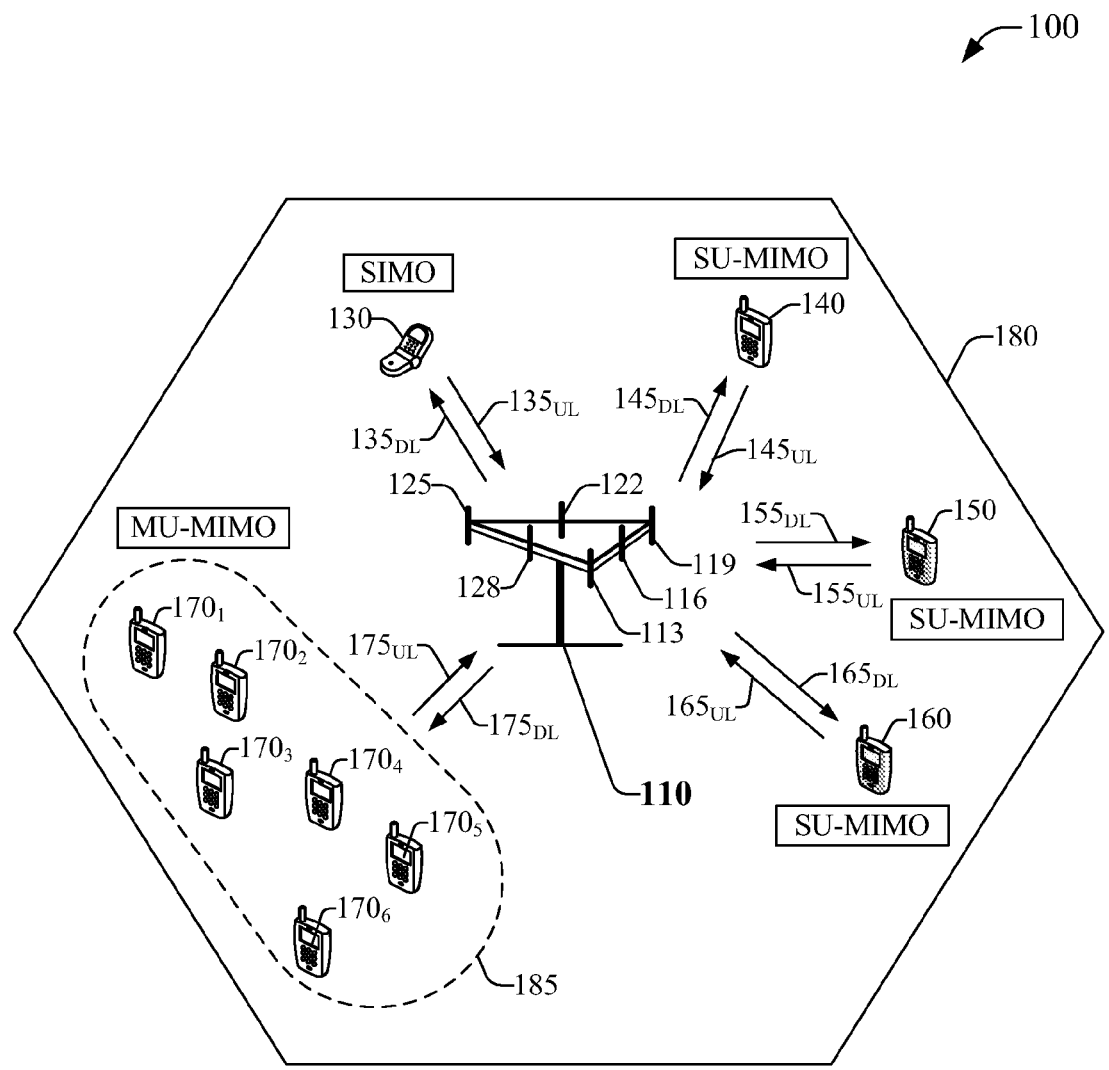
FIG. 1 illustrates an example multiple access wireless communication system where an access point with multiple antennas simultaneously communicates with various access terminals that operate in SIMO, SU-MIMO, and MU-MIMO mode according to aspects disclosed herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and, or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self-contained device such as a personal digital assistant (PDA). A wireless terminal may also be called a system, a wireless device, a subscriber unit, a subscriber station, a mobile station, a mobile terminal, a remote station, an access terminal, a remote terminal, an access terminal, user terminal, a user agent, a user device, a customer premises equipment, or a user equipment, cellular telephone, personal communication service (PCS) telephone, cordless telephone, a session initiation protocol (SIP) telephone, a wireless local loop (WLL) station, a handheld device having wireless connection capability, or other processing device connected to a wireless modem.

A base station may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point, Node B, evolved Node B (eNodeB), or some other terminology.

As it is discussed in greater detail below, system(s) and method(s) are disclosed that facilitate to transmit simultaneously a plurality of communication channels with disparate error rate requirements in a single-carrier waveform format. A first channel and a second channel are coded individually to form an alphabet for a first and a second constellation. Prior to transmission, P bits (P a positive integer) of information of the first channel and Q bits (Q a positive integer) of the second channel are modulated with a hierarchical modulation constellation generated through a combination of the first a second constellation; each constellation is assigned a configurable weight (e.g., a "hierarchic weight") that is expressed in terms of a configurable energy ratio. The energy ratio determines the resilience of bits associated with the first and second channel. Bit mapping within the first and second constellation provides redundancy to mitigate error rate within each quadrant of the hierarchical constellation. Hierarchical modulation of more than two channel can be accomplished through the same principal of individual coding and constellation composition.

Referring to the drawings, FIG. 1 illustrates a multiple access wireless communication system 100 where an access point 110 with multiple antennas 113-128 simultaneously schedules, and communicates with, various mobile terminals in SIMO, SU-MIMO, and MU-MIMO modes of operation according to aspects disclosed herein. The mode of operation is dynamic: access point 110 can reschedule the mode of operation of each of terminals 130-160 and $170_1$-$170_6$. In view of the latter, FIG. 1 illustrates a snapshot of communication links between terminals and antennas. As illustrated, such terminals can be stationary or mobile and, dispersed throughout a cell 180. As used herein and generally in the art, the term "cell" can refer to base station 110 and/or its coverage geographic area 180 depending on the context in which the term is used. Further, a terminal (e.g., 130-160 and $170_1$-$170_6$) can communicate with any number of base stations (e.g., shown access point 110) or no base stations at any given moment. It is noted that terminal 130 has a single antenna and therefore it operates in SIMO mode substantially at all times.

Generally, access point 110 possesses $N_T \geq 1$ transmit antennas. Antennas in access point 110 (AP) are illustrated in multiple antenna groups, one including 113 and 128, another including 116 and 119, and an additional including 122 and 125. In FIG. 1, two antennas are shown for each antenna group, even though more or fewer antennas can be utilized for each antenna group. In the snapshot illustrated in FIG. 1, access terminal 130 (AT) operates in SIMO communication with antennas 125 and 122, where antennas 125 and 122 transmit information to access terminal 130 over forward link $135_{FL}$ and receive information from access terminal 130 over reverse link $135_{RL}$. Mobile terminals 140, 150, and 160 each communicate in SU-MIO mode with antennas 119 and 116. MIMO channels are formed between each of terminals 140, 150, and 160, and antennas 119 and 116, leading to disparate FLs $145_{FL}$, $155_{FL}$, $165_{FL}$, and disparate RLs $145_{RL}$, $155_{RL}$, $165_{RL}$. Additionally, in the snapshot of FIG. 1, a group 185 of terminals 1701-1706 is scheduled in MU-MIMO, having formed multiple MIMO channels between the terminal in the group 185 and antennas 128 and 113 in access point 110. Forward link $175_{FL}$ and reverse link RL $175_{RL}$ indicate the multiple FLs and RLs existing between terminals $170_1$-$170_6$ and base station 110.

In an aspect, system such as LTE and WiMAX can exploit MIMO operation within both frequency division duplex (FDD) communication and time division duplex (TDD) communication. In FDD communication, links $135_{RL}$-$175_{RL}$ employs different frequency bands from respective links $135_{FL}$-$175_{FL}$. In TDD communication, links $135_{RL}$-$175_{RL}$ and $135_{FL}$-$175_{FL}$ utilize the same frequency resources; however, such resources are shared over time among forward link and reverse link communication.

In another aspect, system 100 can utilize one or more multiple-access schemes, such as CDMA, SDMA, TDMA, FDMA, OFDMA, single-carrier FDMA (SC-FDMA), space division multiple access (SDMA), and/or other suitable multiple-access schemes. TDMA utilizes time division multiplexing (TDM), wherein transmissions for different terminals 130-160 and $170_1$-$170_6$ are orthogonalized by transmitting in different time intervals. FDMA utilizes frequency division multiplexing (FDM), wherein transmissions for different terminals 130-160 and $170_1$-$170_6$ are orthogonalized by transmitting in different frequency subcarriers. As an example, TDMA and FDMA systems can also use code division multiplexing (CDM), wherein transmissions for multiple terminals (e.g., 130-160 and $170_1$-$170_6$) can be orthogonalized using different orthogonal codes (e.g., Walsh-Hadamard codes, polyphase codes, Kasami codes) even though such transmissions are sent in the same time interval or frequency subcarrier. OFDMA utilizes orthogonal frequency division Multiplexing (OFDM), and SC-FDMA utilizes single-carrier FDM. OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. While pilot design and scheduling of SIMO, SU-MIMO, and MU-MIMO user described herein are generally described for an OFDMA system, it should be appreciated that the techniques disclosed herein can similarly be applied to substantially any wireless communication system operating in multiple access.

In a further aspect, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Each group of antennas and/or the area in which they are designed to communicate is often referred to as a sector of the access point. A sector can be an entire cell 180, as illustrated in FIG. 1, or a smaller region. Typically, when sectorized, a cell (e.g., 180) includes a few sectors (not shown) covered by a single access point, such as 110. It should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. While the following description generally relates to a system in which each terminal communicates with one serving access point (e.g., 110) for simplicity, it should further be appreciated that terminals can communicate with substantially any number of serving access points.

In communication over forward links $135_{FL}$-$175_{FL}$, the transmitting antennas of access point 110 can utilize beamforming (e.g., to effect SDMA communication) in order to improve the signal-to-noise ratio of forward links for the different access terminals 130-160 and $170_1$-$170_6$. Also, an access point using beamforming to transmit to access terminals scattered randomly through its coverage causes less interference to access terminals in neighboring cells than an access point transmitting through a single antenna to all its access terminals.

It is noted that base station 110 can communicate via backhaul network with other base stations (not shown) that serve other cells (not shown) in the cellular network of which cell 180 is part of Such communication is a point-to-point communication effected over the cellular network backbone, which can employ of T-carrier/E-carrier links (e.g., T1/E1 lines), as well as packet-based internet protocol (IP).

Figure 2:
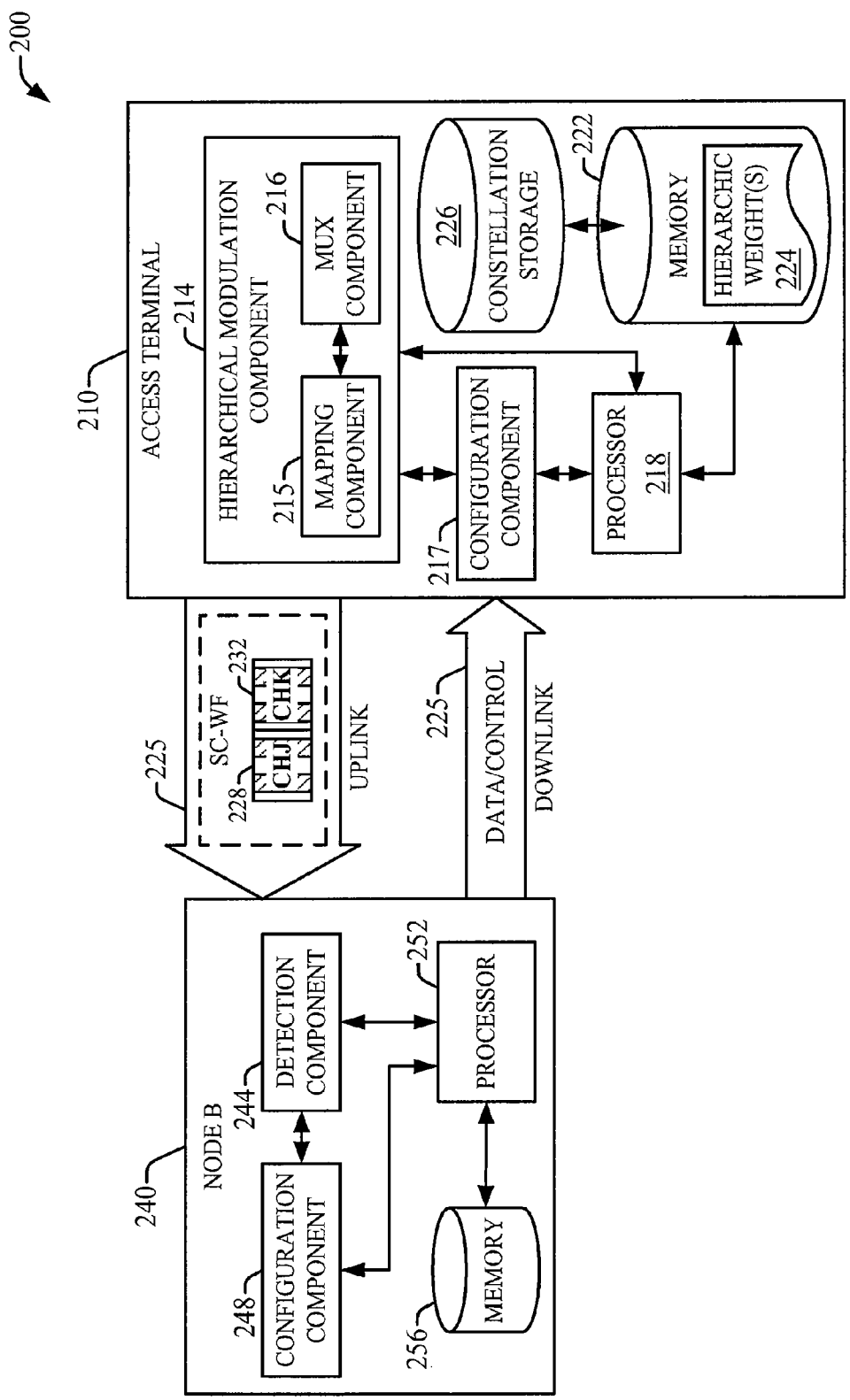
FIG. 2 illustrates an example system that exploits hierarchical modulation to convey a set of control channels in accordance with aspects described in the subject specification.

FIG. 2 illustrates an example system 200 that exploits hierarchical modulation to convey a set physical layer channels. Channels can be traffic channels or control channels (e.g., channel quality indication (CQI), rank indication (RI), acknowledge/not-acknowledge (ACK/NACK), precoding matrix indicator (PMI)). Disparate channels, either transport or control channels, are generally conveyed with disparate formats. Such formats typically include disparate conveyed bits based on mode of operation; for instance ACK in LTE conveys 1 bit of information in SIMO, whereas it conveys 2 bits in SU-MIMO mode, while CQI conveys 5 bits of information in SIMO and 8 bits of information in SDMA and SU-MIMO. For LTE, it should also be appreciated that in uplink communication of traffic or control channel a single-carrier FDMA waveform is utilized for communication.

In example system 210, a novel hierarchical modulation is provided. Hierarchical modulation affords simultaneous communication of disparate channels, e.g., CHJ 228 and CHK 232, within a single-carrier FDMA format. To at least that end hierarchical modulation component 214 modulates a set of control channels like Channel J (CHJ) 228 and Channel K (CHK) 232 in accordance with a modulation constellation $\chi$ that is a hierarchic superposition of constellations $\chi_B$ and $\chi_E$:

$$\chi = \alpha_B \chi_B + \alpha_E \chi_E, \quad (1)$$

wherein $\alpha_B$ and $\alpha_E$ are hierarchic weights of the hierarchical constellation $\chi$, and satisfy $\alpha_B^2 + \alpha_E^2 = 1$. The hierarchy of constellations $\chi_B$ and $\chi_E$ is dictated by the relative magnitude of the hierarchic weights, such relative magnitude can be determined through an "energy ratio" $\epsilon$ which can be defined as:

$$\varepsilon = \frac{\alpha_B^2}{\alpha_E^2}. \quad (2)$$

Hierarchic weights can be expressed in terms of the energy ratio ε as follows.

$$\begin{cases} \alpha_B = \sqrt{\dfrac{\varepsilon}{1+\varepsilon}} \\ \alpha_E = \sqrt{\dfrac{1}{1+\varepsilon}} \end{cases} \quad (3)$$

The leading hierarchic weight, e.g., as defined in Eq. (3), determines the constellation that is afforded a stronger protection for encoding, while the constellation associated with the remaining weight afforded a weaker protection. It should be appreciated that herein the term "protection" refers to erasure mitigation. Nearly-symmetric error rate can be accomplished through small (O(1)) energy ratios.

Hierarchical modulation component 214 relies on mapping component 215 to map information bits associated with CHJ 228 and CHK 232 to constellations $\chi_A$ and $\chi_B$, respectively. Such structure is illustrated below (see FIG. 3A). Additionally, hierarchical modulation component 214 includes a multiplexing (MUX) component 216 that multiplexes a set of points in a hierarchical constellation c, which includes bits of information for both channel CHJ 228 and CHK 232, within a granted (by Node B 240) set of tones (e.g., in LTE the set of tones can be an isochronous slice of one or more resource blocks (RBs), each RB includes 12 subcarriers per OFDM symbol).

Hierarchical modulation component 214 conveys the multiplexed, hierarchically modulated symbols for channels CHJ 228 and CHK 232.

A set of constellations $\chi$, $\chi_A$, and $\chi_B$, can be stored in constellation store 226. It should be appreciated that constellation storage 226 can also be a part of memory 222. Constellations $\chi_B$ and $\chi_E$ possess, respectively, alphabets $A_B$ and $A_E$, such alphabets comprise codewords $N_B$ and $N_E$ which afford encoding $\log_2 N_\lambda$ bits ($\lambda$=B, E). It is to be noted that constellation $\chi_\lambda$ can be substantially any constellation and need not be the same as other constellation that enters the hierarchic constellation $\chi$; for instance, constellation $\chi_\lambda$ can be a constellation associated with a binary phase-shift keying modulation (BPSK), a quadrature phase-shift keying (QPSK) modulation, a quadrature amplitude modulation (QAM), M-ary QAM (M-QAM), and so on. It is to be noted that depending wireless communication technology (e.g., LTE, UMB) utilized for communication in example system 200, a specific set of modulations, and thus constellations, may be available. For example, in LTE, QPSK, 16-QAM, or 64-QAM are available for modulation of the Physical Uplink Control Channel (PUCCH).

In an aspect, configuration component 222 can adjust energy ratios, or hierarchic weight(s) 224, to establish a specific erasure/error rate for CHJ 228 and CHK 232. For instance, an energy ratio can be adjusted on a per-terminal basis, which can include adjustments on (i) a per-flow basis; for instance, specific executed applications like voice, video- and music-streaming are sensitive to latency and jitter, thus an energy ratio ε can be configured to ensure mitigation of latency and jitter; and (ii) a per-equipment mode of operation, such as SISO, SIMO, SU-MIMO, and MU-MIMO. In an aspect, configuration component can adjust energy ratio(s) or hierarchic weight(s) 224, upon receiving specific signaling 225 such as an express indication (e.g., an E-bit codeword with E a positive integer) to adjust e, a scheduling grant, an other-sector interference indication, a handover request, uplink signal strength, and so on. Also, specific characteristics of received data 225 can trigger an adjustment of energy ratio or hierarchic weight(s) 224; for example, statistics of received data packets, packet format, and so on.

It should be appreciated that T-tier hierarchies, e.g., T hierarchically modulated control channels (T a positive integer greater than 2), are within the scope of the subject innovation. While T-tier hierarchies may introduce additional computational and signaling complexity, a hierarchical modulation of T channels can provides various advantages. For instance, multiple ACK/NACK channels can be conveyed in response to disparate flows with disparate quality of service restrictions, or packet formats.

In example system 200, hierarchical modulation component 210 resides in access terminal 210; however, it should be appreciated that the hierarchical modulation component 210 can reside in substantially any transmitter that conveys control channels.

Hierarchically modulated channels can be received by Node B 240. A detection component 214 decodes the received hierarchically modulated CHJ 228 encoded in a base layer, and CHK 232 encoded in an enhanced layer. Base layer decoding can proceeds through computation of log-likelihood ratios (LLRs) from all codewords, or constellation points, in a hierarchical constellation utilized for modulation. Enhanced layer decoding can be implemented in serial or parallel with base layer decoding. Serial decoding of enhanced layer entails (i) detection of base layer and cancellation of decoded base layer from soft symbols, and (ii) computation of LLRs from enhancement layer constellation codewords. It should be appreciated that in serial decoding, the more robust channel (e.g., low-error rate) can be decoded first; namely, the channel encoded in the base layer is decoded first. Due to the hierarchical decoding, once base-layer information bits are decoded, information on constellation quadrant is straightforwardly extracted. Parallel decoding relies on LLR computation from all codewords in hierarchical constellation.

Detection mechanisms exploited by detection component 244 can include a maximum likelihood (ML) estimator, a minimum mean square equalizer (MMSE), a zero forcing (ZF) filter, or maximal ratio combining (MRC) filter. Such detection components can incorporate additionally a successive interference cancellation (SIC) component. Moreover, detection component 244 can perform serial-to-parallel splitting of a received data stream, cyclic prefix removal, and inverse/direct Fourier and/or Hadamard transformation(s) in order to extract received symbols.

It should be appreciated that M-tier hierarchies, e.g., M hierarchically modulated control channels (M a positive integer greater than 2), can be decoded either in serial or parallel. It is noted that processor 252 is configured to perform at least a portion of the actions, e.g., computations, and logic associated with functionality and operation of detection component 244.

In addition to detection component 244, Node B 240 includes a configuration component 248 that can establish hierarchic weight(s) 224 and convey such weight, or an indication thereof (e.g., an L-bit codeword to be used in conjunction with a lookup table in access terminal 210 in order to set a hierarchic weight), in a data or control communication 258. Configuration component 248 can adjust hierarchic weight(s) 224 based at least in part on quality of service (QoS), e.g., specific erasure/error rates for CHJ 228 and CHK 232. For example, it is to be appreciated that error rates in control channels like CQI and ACK can be critical to retaining QoS metrics such as subscriber agreed service, for example, guaranteed bit rate (GBR), average bit rate (ABR), and minimum bit rate (MINBR); block error rate (BLER), packet error rate (PER), bit error rate (BER); and peak data rate (PDR). It is to be noted that configuration component 248 can adjust hierarchic weight(s) 224 on a per-subscriber basis since disparate subscribers can have access to disparate rate levels; e.g., enterprise subscribers can have access to hard QoS that ensures a specific GBR rather than a MINBR. Configuration component 248 can also configure hierarchic weight(s) 224 on a per-flow basis, wherein disparate applications executed by a subscriber are serviced within different agreed rates, and thus different quality, resilience, or integrity of control (error rate in CQI and ACK) can be warranted. For instance, voice communication, ecommerce, or wireless banking can depend critically on accurate CQI and ACK, whereas application such as web browsing, or file transfer can tolerate an significantly asymmetric quality (e.g., erasure rate) among CQI and ACK.

Configuration component can configure energy ratios or hierarchic weights in accordance with changes in operation mode of mobile station(s). For example, configuration component 248 can adjust either adjust hierarchic weight(s) 224, or convey an indication for adjustment thereof, as a response to scheduled changes in mode of operation (e.g., SISO, SIMO, SU-MIMO, or MU-MIMO) of a mobile station. Such modes of operation, and their afforded capacity, depend to substantially different extents on access to channel state information (e.g., CQI and ACK, which reflect channel strength conditions and packet transmission efficiency) at a served terminal.

Furthermore, user equipment generally possesses a specific set of technical capabilities like number of antennas, multi-mode (e.g., multiple system bandwidth operation; multiple telecommunication technology such as WCDMA, HSDPA; or telecommunication services like GPS) or single-mode chipsets, battery resources (e.g., long discharge characteristic time, solar-power assisted, . . . ), and so on, which can result in substantially different operation performance on availability or generation of simultaneous control channels such as CQI, or ACK/NACK. For example, generation and transmission of highly asymmetric quality CHJ 228/CHK 232 can result in excessive overhead or unwarranted batter inefficiency; thus, configuration component can optimize a relative quality for CHJ 228 and CHK 232 through hierarchic weight(s) 224.

In an aspect, in example system 200, configuration components 217 and 248 can rely upon an intelligent component (not shown) to autonomously find, adapt, or optimize values of energy ratios or hierarchic weights 224 in accordance with aspects described above. To that and other ends related to adaptation or optimization in other portions of the subject description associated with additional functionalities of the subject innovation, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis such as primary component analysis, spectral analysis like wavelet decomposition, genetic algorithms, and reinforced learning—to a set of available data (information) on the wireless communication system (e.g., service cell 180).

In particular, to the accomplishment of the various automated aspects described above and other automated aspects relevant to the subject innovation described herein, an intelligent component (not shown) can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.

It is to be appreciated that in example system 200, detection component 244 resides in Node B 210, even though this detection component can reside in substantially any receiver that operates in a wireless environment and receives control signaling.

It is to be noted that processors 252 and 218 are configured to perform at least a portion of the functional actions, e.g., computations, necessary to implement the functionality described herein of substantially any component in Node B 240 and access terminal 210, respectively. Memories 256 and 222 can retain data structures, code instructions, algorithms, and the like, that can be employed, respectively, by processors 225 and 218 when conferring Node B 240 or access terminal 210 its functionality.

Figure 3A:
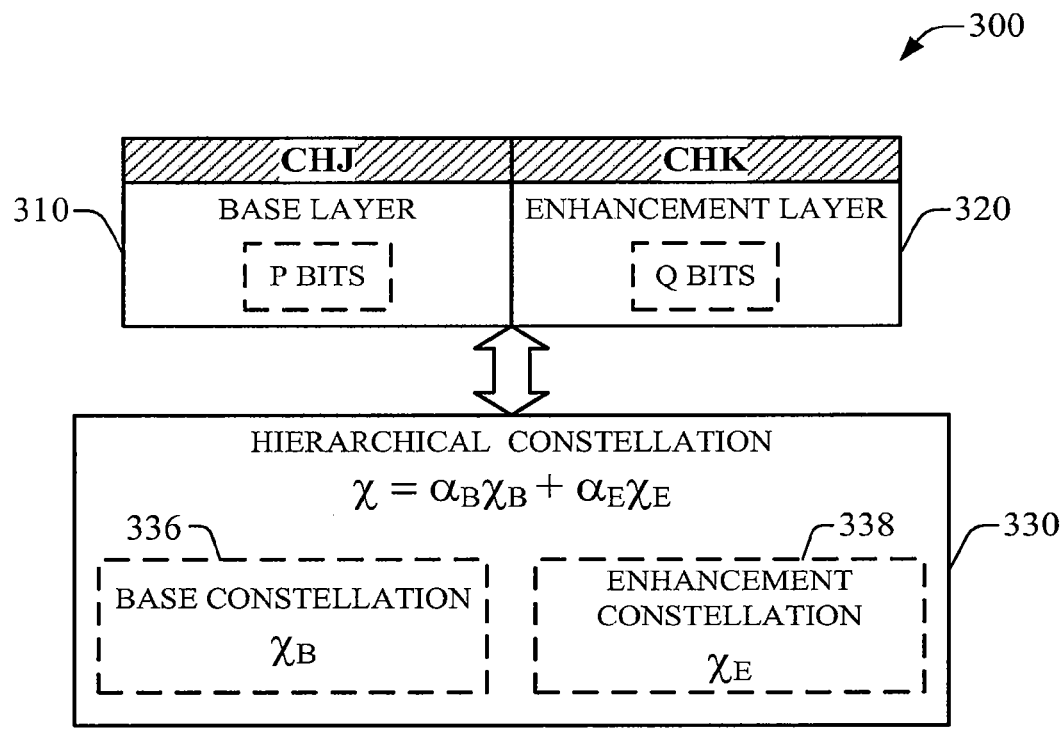
FIGS. 3A and 3B illustrate hierarchical modulation of a first and second channel in accordance with aspects described in the subject specification.
Figure 3B:
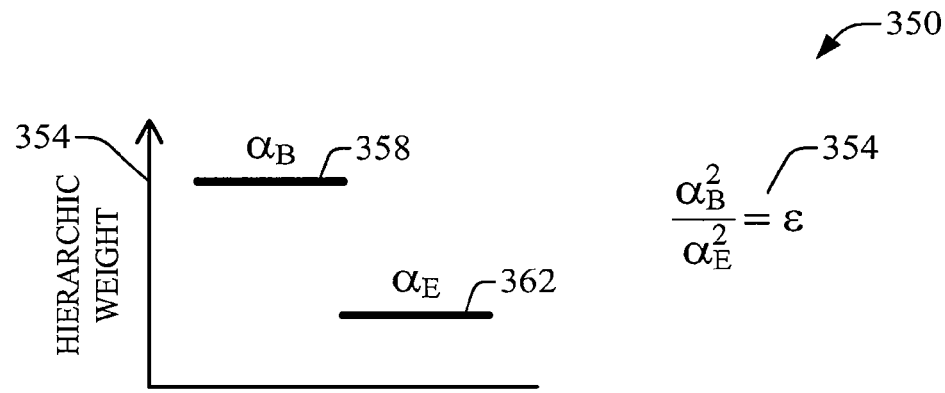

FIGS. 3A and 3B illustrate hierarchical modulation of channels CHJ 228 and CHK 232. FIG. 3A is a diagram of a base layer 310 that comprises P bits of information and an enhanced layer 320 which includes Q bits of information, respectively. Bits in the base layer and enhancement layer are coded independently. Modulation of P+Q bits is based on a hierarchical constellation c 330, which comprises two constellations, one constellation $\chi_B$ 336 with $2^Q$ codewords and a second constellation $\chi_E$ 338 with $2^P$ codewords. Mapping of information bits to the alphabet of $\chi$ 330 is performed in accordance with base layer and enhancement layer, wherein the first P bits modulated in codeword, or constellation point, correspond to the first channel CHJ 228, and the trailing Q bits correspond in turn to the second channel CHK 232.

FIG. 3B is a diagram that displays illustrative hierarchic weights $\alpha_B$ 358 and $\alpha_E$ 362. As discussed, above the hierarchic weights define an energy ratio $$\varepsilon = \frac{\alpha_B^2}{\alpha_E^2}$$

354 which determines quantifies the two-tier hierarchy among $\chi_B$ 336 and $\chi_E$ 338. A larger hierarchic weight confers a larger degree of protection to the modulated bits of information associated with the constellation that carries the larger weight. To complement protection, bit mapping is to be hierarchical in the sense that bits in a base layer are mapped to the first P bits in a constellation codeword, and bits in the enhancement layer are mapped to remaining Q bits.

Figure 4:
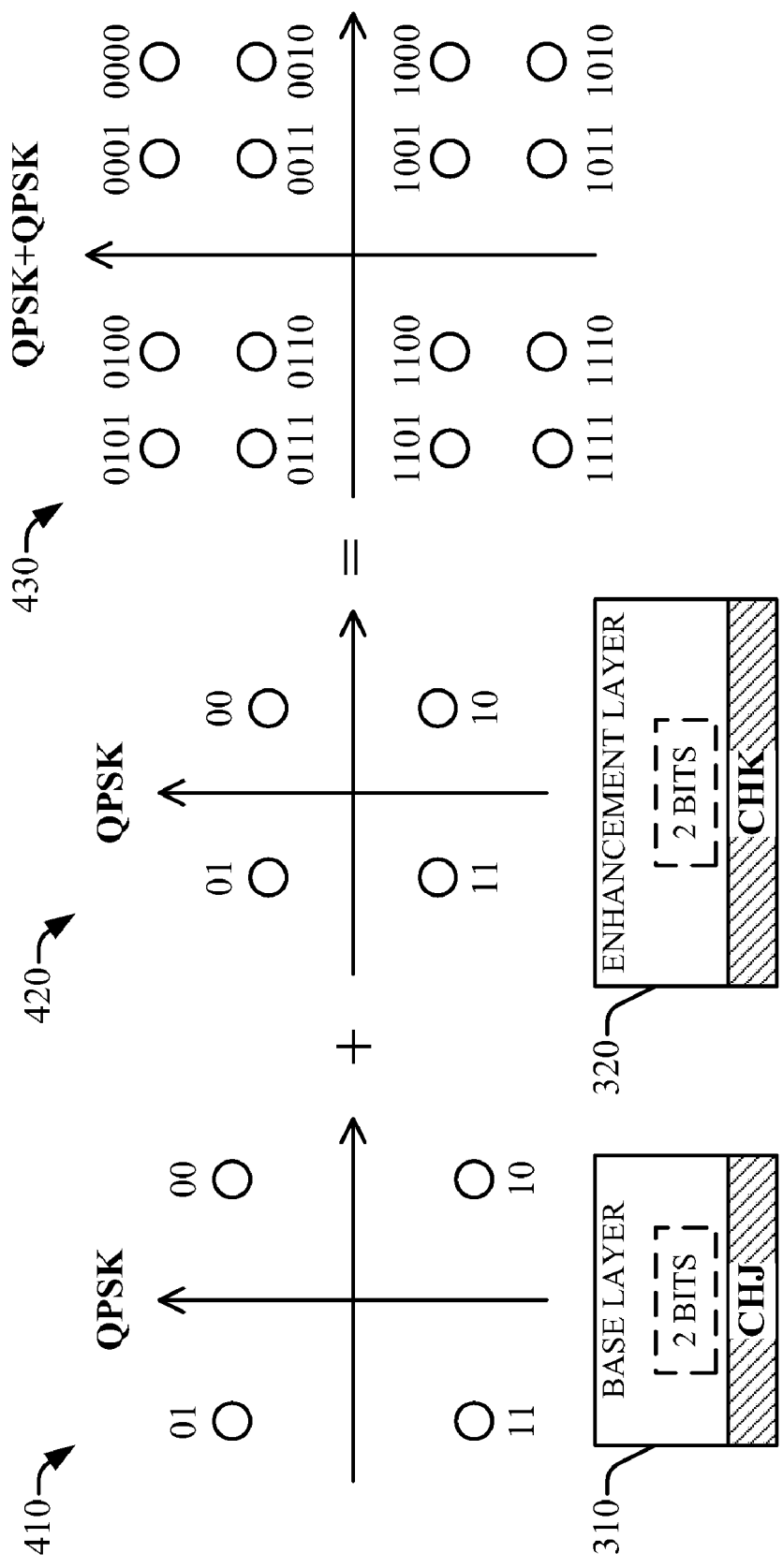
FIGS. 4A through 4C illustrate a hierarchical constellation $\chi$ that is a superposition of two QPSK constellations, with information bits of a first channel mapped on a 2-bit base layer and information bits of a second channel mapped on an 2-bit enhancement layer in accordance with aspects described herein.

FIG. 4 illustrates an example hierarchical constellation $\chi$ that is a superposition of two QPSK constellations, the bit mapping in $\chi$ results from mapping 2 bits of information for base layer 310 and 2 bits of information for enhancement layer 320. First constellation $\chi_B$ 410 and a second constellation $\chi_E$ 420 map 2 bits of information associated with CHJ 228 (e.g., ACK channel) and CHK 232 (e.g., CQI channel), respectively. Each quadrant in resulting hierarchical constellation c 430 is associated with a same pair of information bits for the base layer, e.g., '00' in first quadrant (I,Q>0), whereas disparate constellation points in each quadrant carry disparate pair of information bits for enhancement layer. It is to be noted that constellations 410 and 420 are encoded individually and such encoding remains the same regardless of the energy ratio among $\chi_B$ 410 and $\chi_E$ 420. The redundancy of base layer bits in each quadrant provides increased relative protection with respect to information bits of enhancement layer.

Figure 5A:
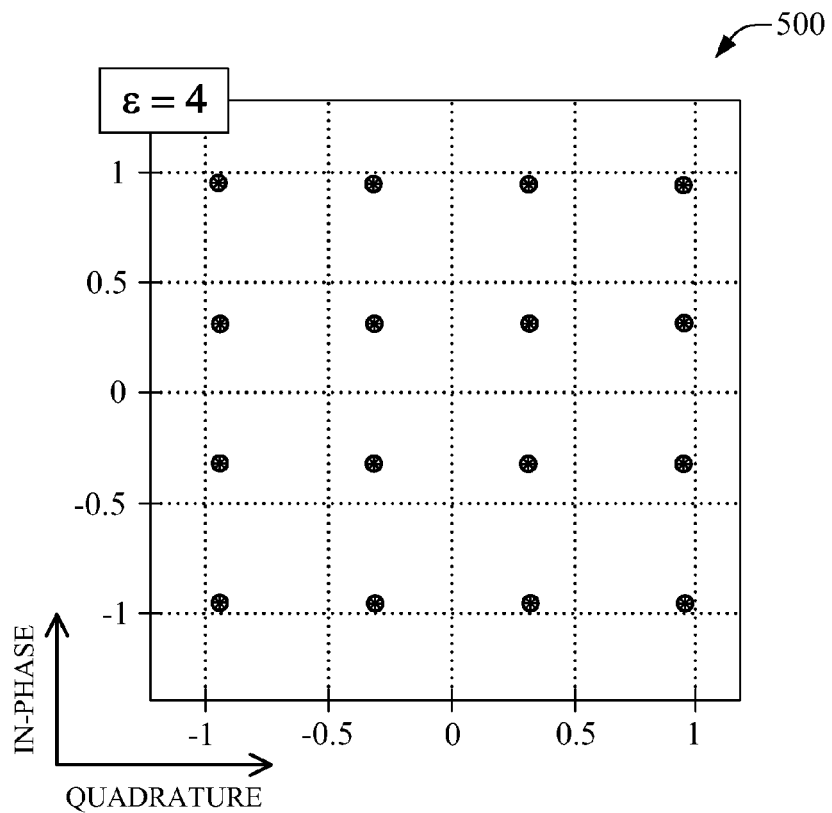
FIGS. 5A-5D illustrate hierarchical constellations that are a superposition of QPSK constellations for various energy ratios in addition to a 16QAM constellation.
Figure 5B:
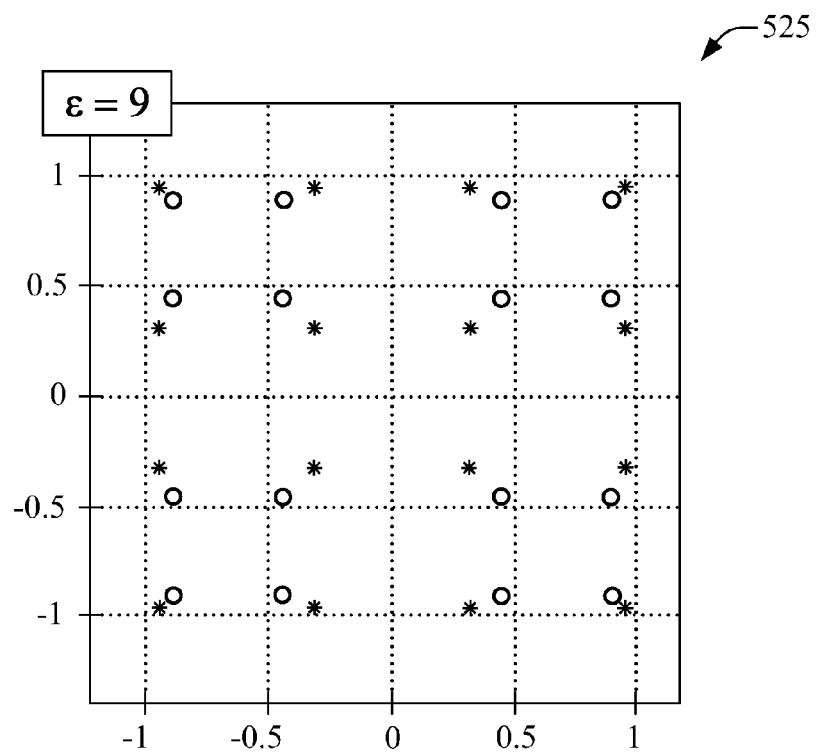
Figure 5C:
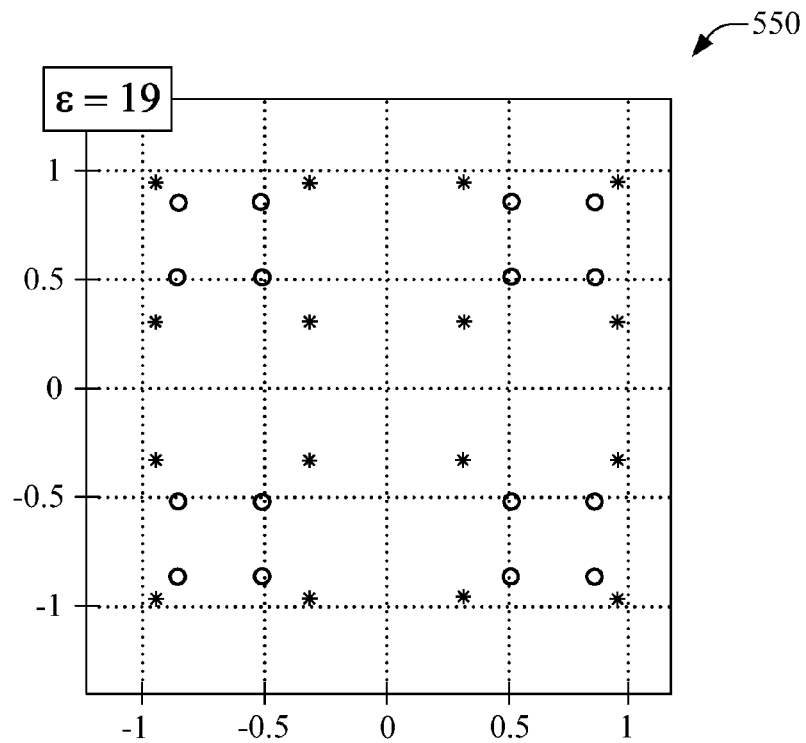
Figure 5D:
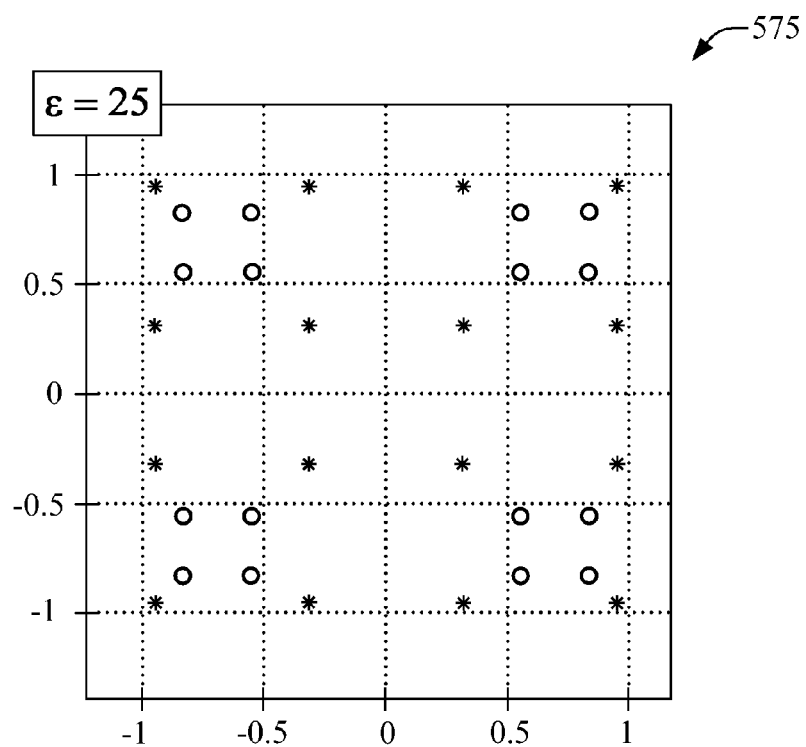

FIGS. 5A through 5D illustrate hierarchical constellations $\{\chi_1, \chi_2, \chi_3, \chi_4\}$ that are a superposition of QPSK constellations for energy ratios $\{\epsilon_1, \epsilon_2, \epsilon_3, \epsilon_4\}$, respectively. For reference a 16-QAM constellation is also illustrated in conjunction with each $\chi_\mu$ ($\mu=1, \ldots, 4$). As the energy ratio is increased, hierarchical constellations $\chi_\mu$ display more pronounced clusters of codewords, or constellation points. Therefore, communication errors in bits associated with a base layer (e.g., CHJ 228) encoded with codewords in disparate clusters are substantially mitigated, whereas bit error rate in an enhanced layer (e.g., CHK 232) is increased. Adjusting energy ratio provides a mechanism to adjust a specific erasure rate for base-layer bits; however, such adjustment of base-layer protection is attained at the expense of enhanced-layer bit error rate. Thus, a tradeoff can be accomplished based on various communication conditions that warrant specific erasure for a channel mapped to base layer and a channel mapped to enhanced layer. As illustrated in FIG. 5A, hierarchical constellation $\chi_1$, which has $\epsilon=4$, is nearly as symmetric as 16QAM. However, in view of the coherent nature of hierarchical constellation $\chi_1$ 500, and that base-layer bits are the first encoded information bits in the hierarchical constellation codewords, codewords in each quadrant remain to convey the same information bits for base layer and thus base layer is slightly more resilient than its enhanced layer counterpart. FIG. 5B reveals that an increase of energy ratio from $\epsilon=4$ to $\epsilon=9$ results in a $\chi_2$ 525 that presents clearly clustered groups of four codewords in each quadrant. The clustering increases a distinction among constellation points associated with disparate base-layer information bits, thus substantially more protection is afforded to such layer at the expense of resilience of enhanced layer information bits, which are mapped into codewords within a same quadrant. FIG. 5C displays a further pronounced clustering in each quadrant for $\chi_3$ 550, defined through an energy ratio $\epsilon=19$; $\chi_3$ 550 affords a greater protection to base-layer bits at the expense of lesser protection to enhanced-layer bits. FIG. 5D displays a yet further pronounced clustering of constellation points for $\chi_4$ 575, which results from a superposition with $\epsilon=25$, the clustering further increases integrity of base-layer bits of information at expense of resilience of enhanced-layer bits.

Figure 6:
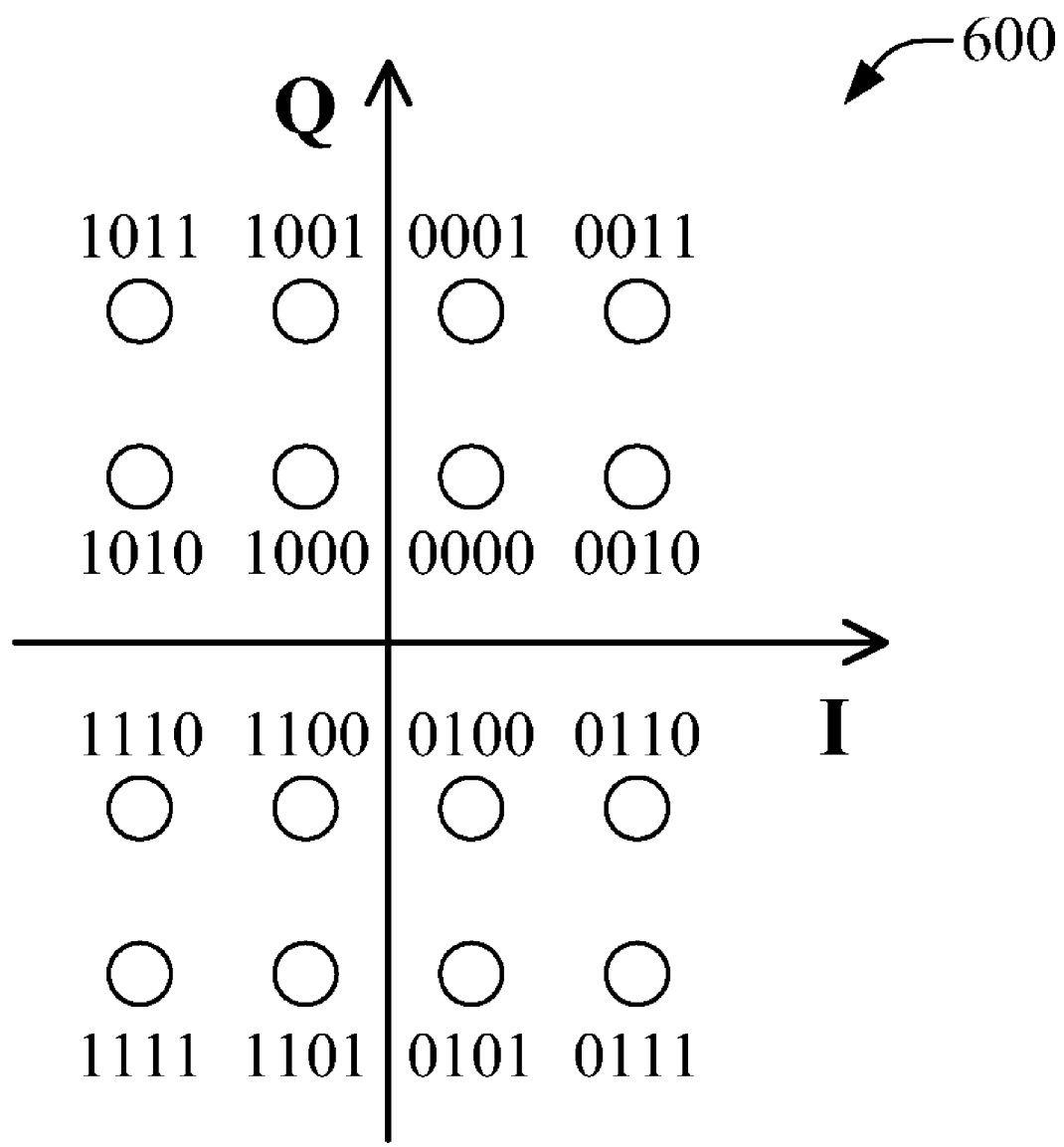
FIG. 6 illustrates a constellation that provides hierarchical erasure/error resilience through Gray coding of a first and second channels in accordance with aspects described herein.

FIG. 6 illustrates a constellation that provides erasure/error resilience through Gray coding as an alternative or in addition to hierarchical superposition. It should be appreciated that Gray mapping with 16-QAM reduces complexity through reduction to a single constellation, or alphabet. As discussed above, 16-QAM with Gray mapping is a quasi-$\chi_1$ (e.g., $\epsilon=4$) hierarchical constellation with Gray coding, in which information bit mapping relies on distinction among most significant bits (MSBs) and least significant bits (LSBs). It should be appreciated that protection afforded to a first channel (e.g., CHJ 228) and a second channel (e.g., CHK 232) is substantially the same.

Figure 7:
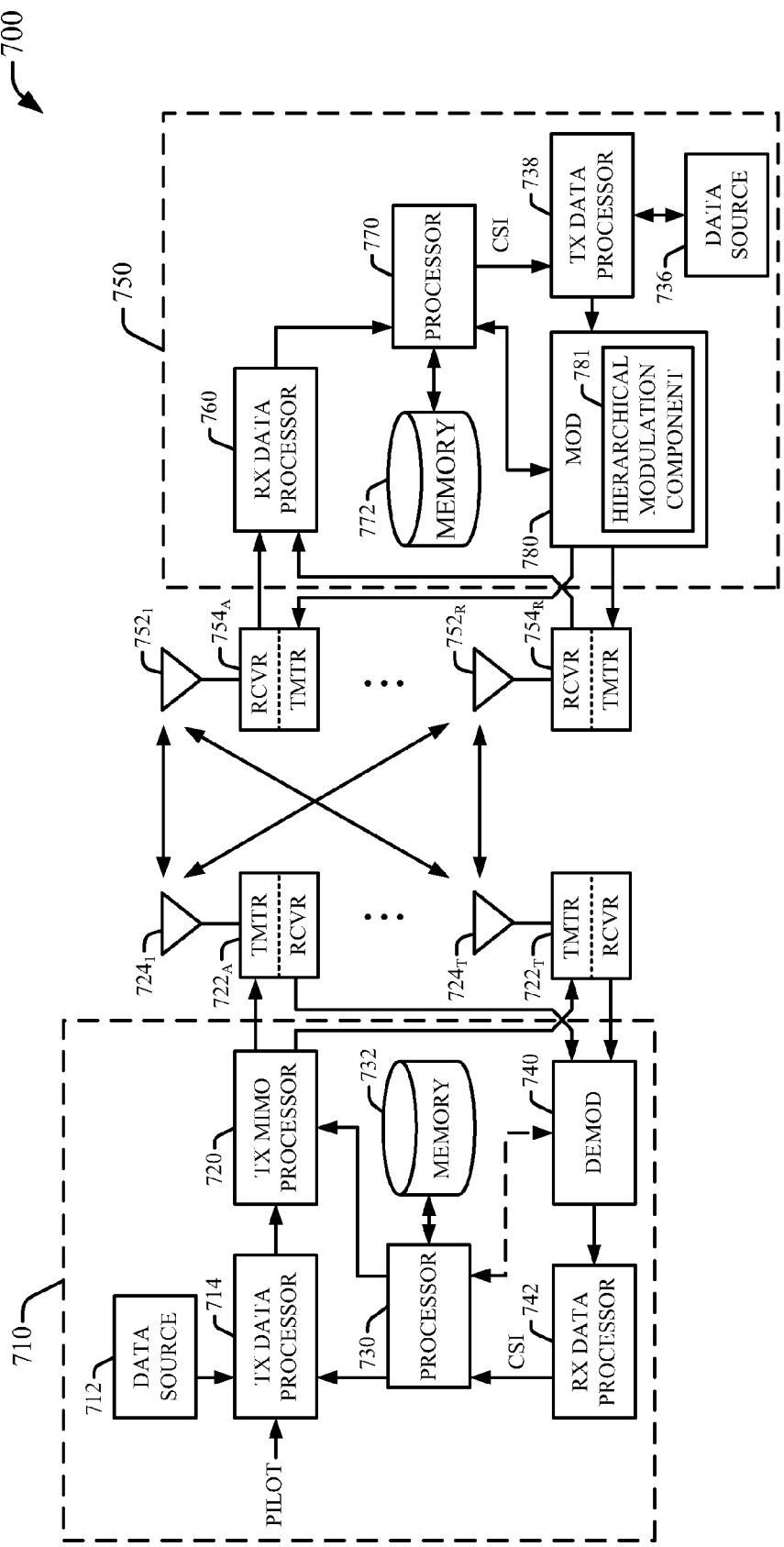
FIG. 7 is a block diagram of an example embodiment of a transmitter system and a receiver system in MIMO operation.

FIG. 7 is a block diagram 700 of an embodiment of a transmitter system 710 (such as Node B 240) and a receiver system 750 (e.g., access terminal 210) in a multiple-input multiple-output (MIMO) system that can provide for cell (or sector) communication in a wireless environment in accordance with one or more aspects set forth herein. At the transmitter system 710, traffic data for a number of data streams can be provided from a data source 712 to transmit (TX) data processor 714. In an embodiment, each data stream is transmitted over a respective transmit antenna. TX data processor 714 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or m-order quadrature amplitude modulation (M-QAM)) selected for that data stream to provide modulation symbols. The data rate, coding, and modulation for each data stream may be determined by instructions executed by processor 730, the instructions as well as the data may be stored in memory 732.

The modulation symbols for all data streams are then provided to a TX MIMO processor 720, which may further process the modulation symbols (e.g., OFDM). TX MIMO processor 720 then provides $N_T$ modulation symbol streams to $N_T$ transceivers (TMTR/RCVR) $722_A$ through $722_T$. In certain embodiments, TX MIMO processor 720 applies beamforming weights (or preceding) to the symbols of the data streams and to the antenna from which the symbol is being transmitted. Each transceiver 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $722_A$ through $722_T$ are then transmitted from $N_T$ antennas $724_1$ through $724_T$, respectively. At receiver system 750, the transmitted modulated signals are received by $N_R$ antennas $752_1$ through $752_R$ and the received signal from each antenna 752 is provided to a respective transceiver (RCVR/TMTR) $754_A$ through $754_R$. Each transceiver $754_1$-$654_R$ conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ transceivers $754_1$-$654_R$ based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710. A processor 770 periodically determines which pre-coding matrix to use, such a matrix can be stored in memory 772. Processor 770 formulates a reverse link message comprising a matrix index portion and a rank value portion. Memory 772 may store instructions that when executed by processor 770 result in formulating the reverse link message. The uplink message may comprise various types of information regarding the communication link or the received data stream, or a combination thereof. As an example, such information can comprise channel quality indication(s), an offset for adjusting a scheduled resource, and/or sounding reference signals for link (or channel) estimation. The uplink message is then processed by a TX data processor 738, which also receives traffic data for a number of data streams from a data source 736, modulated by a modulator 780, conditioned by transceiver $754_A$ through $754_R$, and transmitted back to transmitter system 710. It should be appreciated that the uplink message can include multiple channels transmitted simultaneously, such scenario is handled, at least in part, by hierarchical modulation component 781 which can operate according to aspects described hereinbefore.

At transmitter system 710, the modulated signals from receiver system 750 are received by antennas $724_1$-$724_1$, conditioned by transceivers $722_A$-$722_T$, demodulated by a demodulator 740, and processed by a RX data processor 742 to extract the reserve link message transmitted by the receiver system 750. Processor 730 then determines which pre-coding matrix to use for determining the beamforming weights and processes the extracted message.

When a receiver 750 can be dynamically scheduled to operate in SIMO, SU-MIMO, and MU-MIMO, disparate hierarchical modulation can be warranted when transmitting two channels simultaneously within a single-carrier waveform. Adjustment to hierarchic weights associated with hierarchical constellation(s) can be effected in response to changes in scheduled mode of operation. Next, communication in these modes of operation is described. It is noted that in SIMO mode a single antenna at the receiver ($N_R$=1) is employed for communication; therefore, SIMO operation can be interpreted as a special case of SU-MIMO. Single-user MIMO mode of operation corresponds to the case in which a single receiver system 750 communicates with transmitter system 710, as previously illustrated FIG. 7 and according to the operation described in connection therewith. In such a system, the $N_T$ transmitters $724_1$-$724_T$ (also known as TX antennas) and $N_R$ receivers $752_1$-$752_R$ (also known as RX antennas) form a MIMO matrix channel (e.g., Rayleigh channel, or Gaussian channel, with slow or fast fading) for wireless communication. As mentioned above, the SU-MIMO channel is described by a $N_R \times N_T$ matrix of random complex numbers. The rank of the channel equals the algebraic rank of the $N_R \times N_T$ matrix, which in terms of space-time, or space-frequency coding, the rank equals the number $N_V \leq \min\{N_T, N_R\}$ of independent data streams (or layers) that can be sent over the SU-MIMO channel without inflicting inter-stream interference.

In one aspect, in SU-MIMO mode, transmitted/received symbols with OFDM, at tone ω, can be modeled by:

$$y(\omega)=H(\omega)c(\omega)+n(\omega). \quad (4)$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 710, and $N_V$ can be scheduled at the discretion of the transmitter (e.g., transmitter 710, Node B 250, or access point 110) based at least in part on channel conditions (e.g., reported CQI) and the rank reported (e.g., through RI) in a scheduling request by a terminal (e.g., receiver 750). It should be appreciated that in an instance in which CQI and RI are to be conveyed simultaneously, hierarchical simulation can be exploited to ensure adequate report quality (e.g., error rate) of each of the channels. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 710 allocates to transmit each data stream $N_V$. It should be appreciated that such a power gain matrix can be a resource that is assigned to a terminal (e.g., access terminal 220, receiver 750, or UE 140), and it can be controlled through power adjustment offsets.

Figure 8:
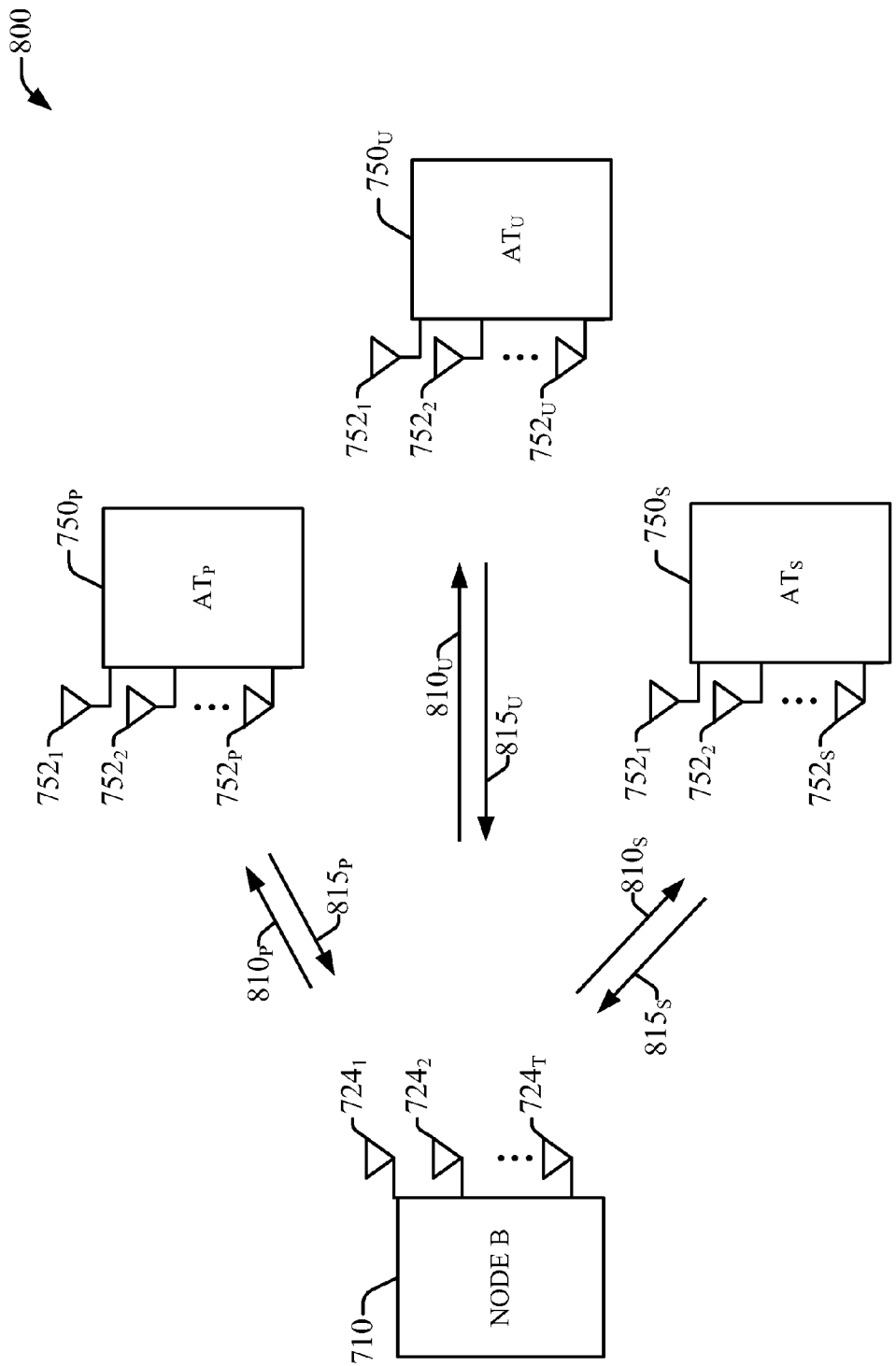
FIG. 8 illustrates an example MU-MIMO system.

As mentioned above, according to an aspect, MU-MIMO operation of a set of terminals (e.g., mobiles $170_1$-$170_6$) is within the scope of the subject innovation. Moreover, scheduled MU-MIMO terminals operate jointly with SU-MIMO terminals and SIMO terminals. FIG. 8 illustrates an example multiple-user MIMO system 800 in which three ATs $750_P$, $750_U$, and $750_S$, embodied in receivers substantially the same as receiver 750, communicate with transmitter 710, which embodies a Node B. It should be appreciated that operation of system 700 is representative of operation of substantially any group (e.g., 185) of wireless devices, such as terminals $170_1$-$170_6$, scheduled in MU-MIMO operation within a service cell by a centralized scheduler residing in a serving access point (e.g., 110 or 250). As mentioned above, transmitter 710 has $N_T$ TX antennas $724_1$-$724_T$, and each of the ATs has multiple RX antennas; namely, $AT_P$ has $N_P$ antennas $752_1$-$652_P$, $AP_U$ has $N_U$ antennas $752_1$-$752_U$, and $AP_S$ has $N_S$ antennas $752_1$-$752_S$. Communication between terminals and the access point is effected through uplinks $815_P$, $815_U$, and $815_S$. Similarly, downlinks $810_P$, $810_U$, and $810_S$ facilitate communication between Node B 710 and terminals $AT_P$, $AT_U$, and $AT_S$, respectively. Additionally, communication between each terminal and base station is implemented in substantially the same manner, through substantially the same components, as illustrated in FIG. 5 and its corresponding description.

Terminals can be located in substantially different locations within the cell serviced by access point 710 (e.g., cell 180), therefore each user equipment $750_P$, $750_U$, and $750_S$ has its own MIMO matrix channel $h_\alpha$ and response matrix $H_\alpha$ (α=P, U, and S), with its own rank (or, equivalently, singular value decomposition). Intra-cell interference can be present due to the plurality of users present in the cell serviced by the base station 710. Such interference can affect CQI and ACK, as well as substantially all traffic and control channels, reported by each of terminals $750_P$, $750_U$, and $750_S$. Accordingly, Node B 710 can adjust a set of hierarchical constellations utilized by terminals $750_P$, $750_U$, and $750_S$ in order to ensure satisfactory accuracy in CQI and ACK reports when conveyed simultaneously.

Although illustrated with three terminals in FIG. 8, it should be appreciated that a MU-MIMO system can comprise any number of terminals, each of such terminals indicated below with an index k. In accordance with various aspects, each of the access terminals $750_P$, $750_U$, and $750_S$ can report CQI and ACK hierarchically modulated to Node B 710. In addition, each of such terminals can transmit to Node B 710 sounding reference signals from each antenna in the set of antennas employed for communication. Node B 710 can dynamically re-schedule each of terminals $750_P$, $750_U$, and $750_S$ in a disparate mode of operation such as SU-MIMO or SIMO.

In one aspect, transmitted/received symbols with OFDM, at tone ω and for user k, can be modeled by:

$$y_k(\omega)=H_k(\omega)c_k(\omega)+H_k(\omega)\Sigma'c_m(\omega)+n_k(\omega). \quad (5)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $H_k$) of symbols transmitted by a transmitter (e.g., access point 210) to the other users in the cell.

Figure 9:
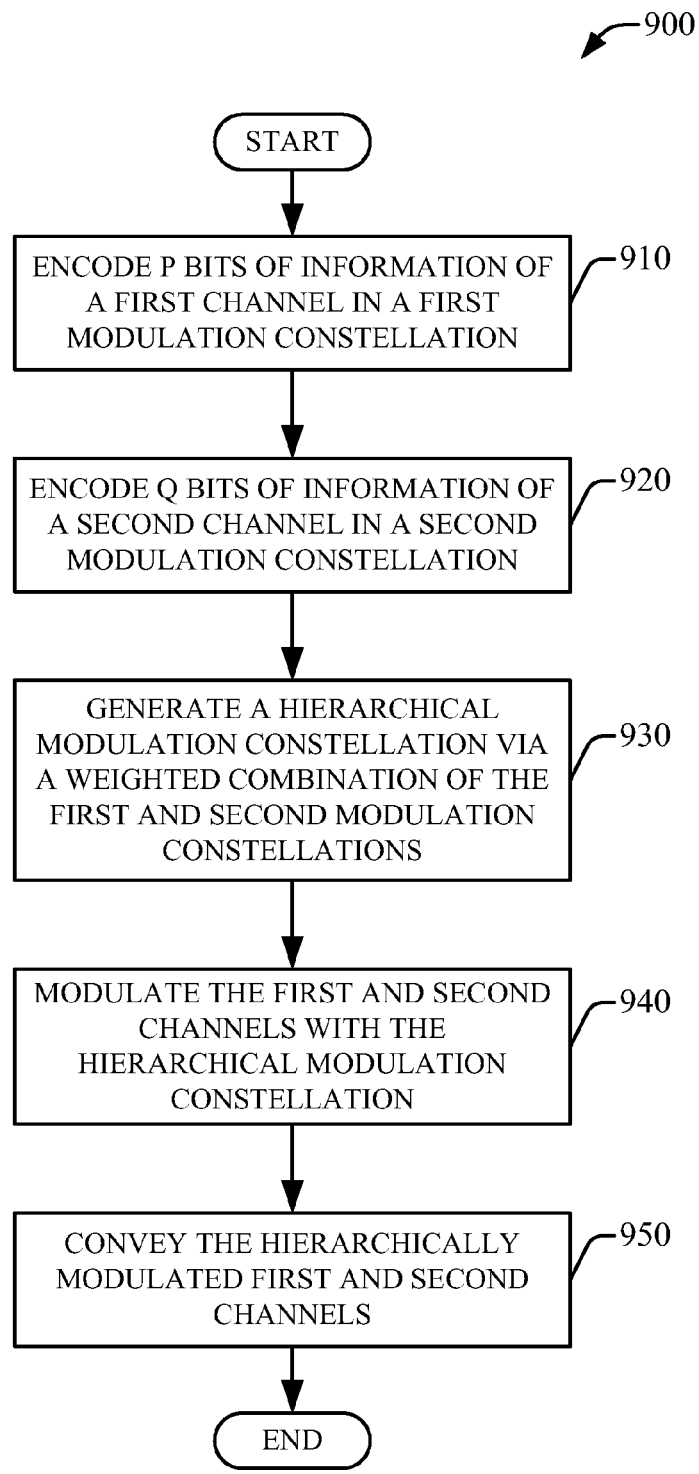
FIG. 9 presents a flowchart of an example method for hierarchically modulating a first and second set of channels according to aspects described herein.
Figure 10:
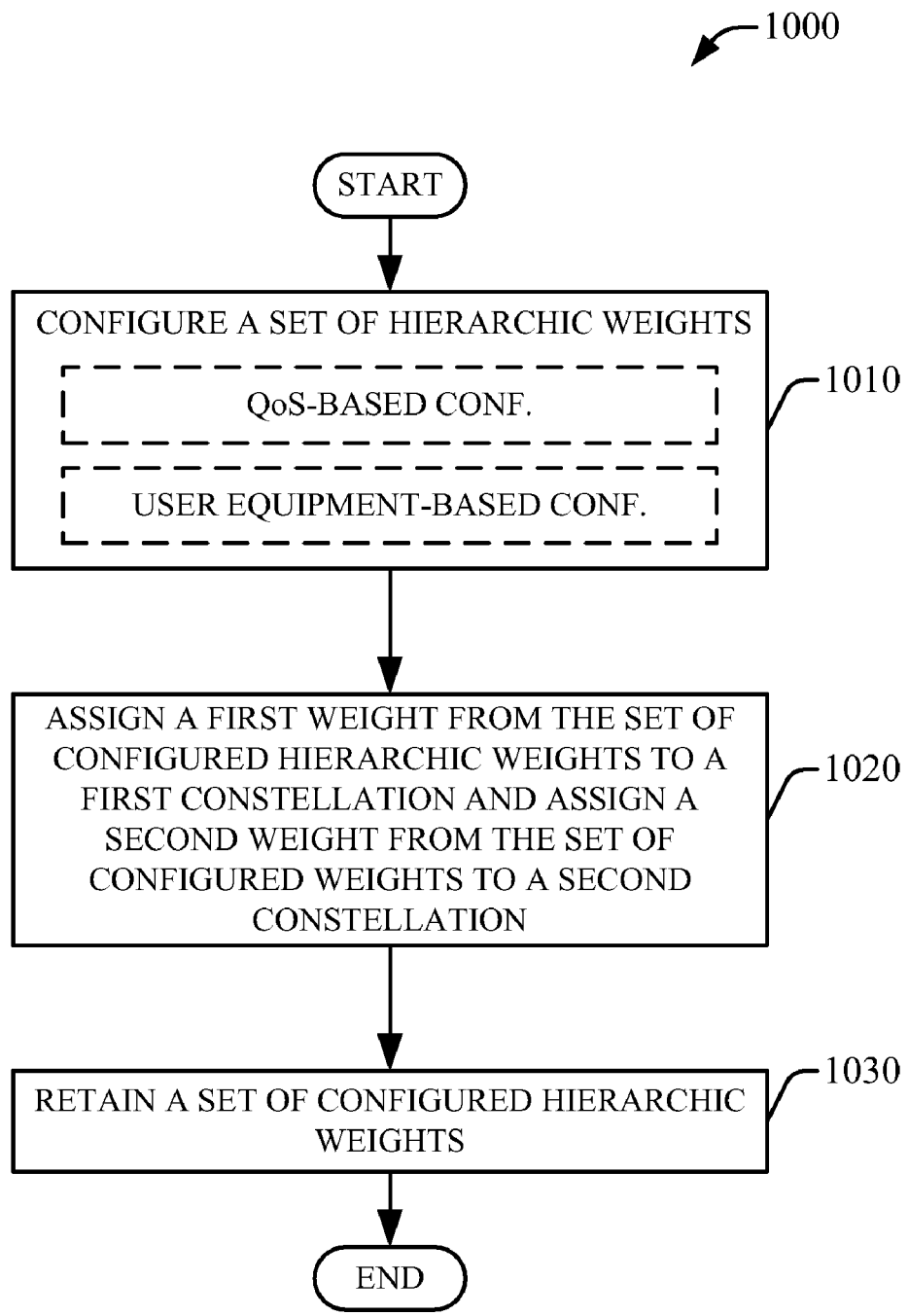
FIG. 10 is a flowchart of an example method for configuring a set of hierarchic weights according to aspects of the subject innovation described herein.
Figure 11:
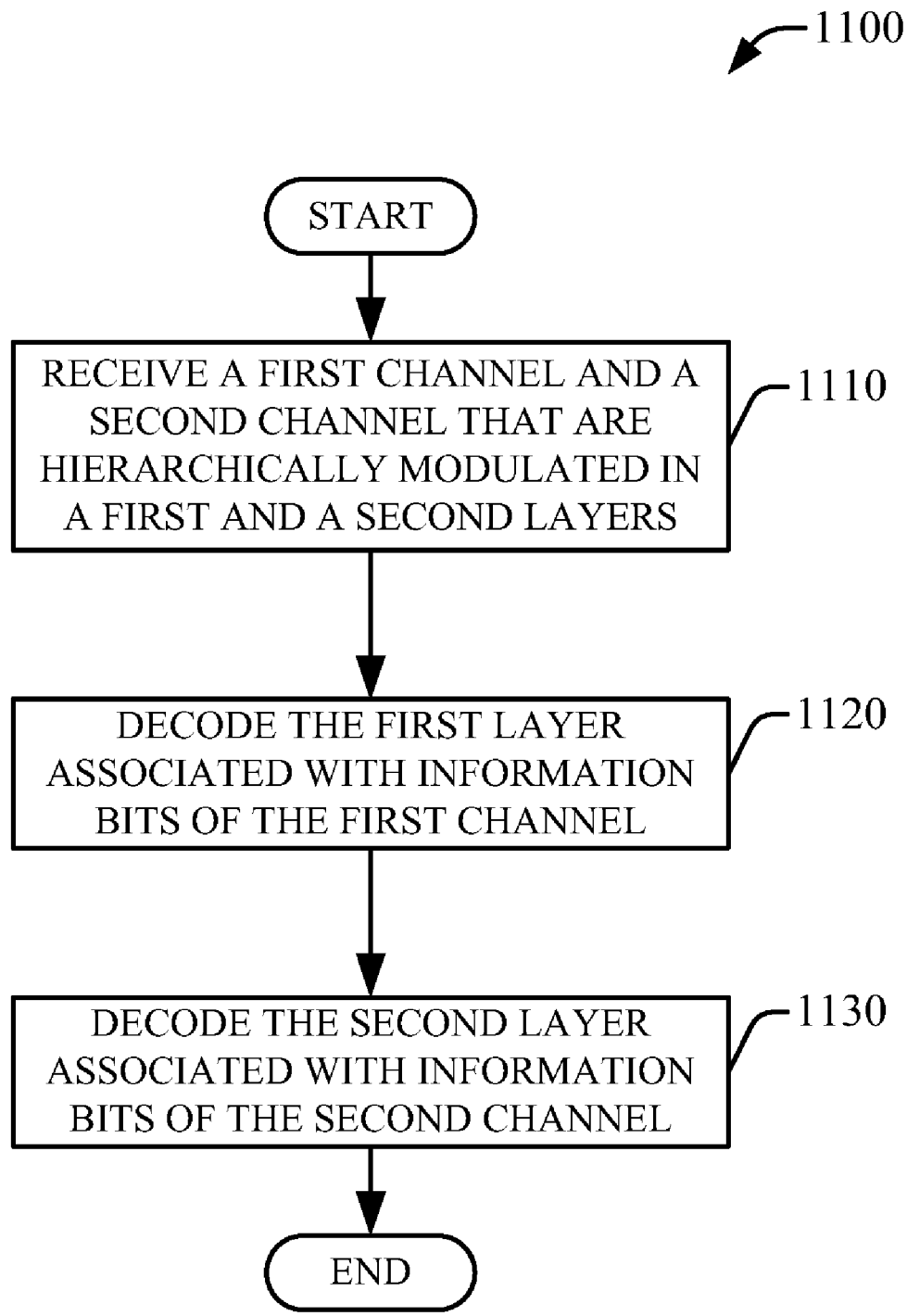
FIG. 11 presents a flowchart of an example method for decoding information bits of a first and second channels hierarchically modulated according to aspects described herein.

In view of the example systems shown and described above, methodologies that may be implemented in accordance with the disclosed subject matter, will be better appreciated with reference to the flowcharts of FIGS. 9, 10 and 11. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component, . . . ). Additionally, it should be further appreciated that the methodologies disclosed hereinafter and throughout this specification are capable of being stored on an article of manufacture to facilitate transporting and transferring such methodologies to various devices. It should be appreciated that a methodology described herein could alternatively be represented as a series of interrelated states or events, such as in a state diagram. In addition, a methodology derived from a combination of at least portions of disparate methodologies described herein may be represented as an interaction diagram or a call flow rather than through flowchart(s).

FIG. 9 presents a flowchart of an example method 900 for hierarchically modulating a first and second set of channels. In an aspect the example method 900 can be utilized by a transmitter in a wireless environment that communicates information in a single-carrier waveform, like an LTE mobile station conveying information in uplink. It should be appreciated that example method 900 can be exploited in substantially any wireless communication technology the relies frequency division multiplexing such as ultra-mobile broadband (UMB) or worldwide interoperability for microwave access (WiMAX).

At act 910, P bits of information of a first channel are encoded in a first modulation constellation. The first channel can be a data channel (PUSCH) or a control channel (PUCCH). The first modulation constellation can be substantially any modulation constellation including M-ary QAM, and on. At act 920, Q bits of information of a second channel are encoded in a second modulation constellation. The second channel can be a data channel (PUSCH) or a control channel (PUCCH). The first modulation constellation can be substantially any modulation constellation including M-ary QAM, and on. At act 930, a hierarchical modulation constellation is generated through a weighted combination of the first and second modulation constellations. In an aspect, the weights are dictated by a configurable energy ratio $\epsilon$ (see Eq. (3) and FIGS. 3A-3B). The energy ratio facilitates, at least partially, determining a relative degree of erasure of information bits encoded in the weighted, combined modulation constellation. At act 940, the first and second channels are modulated with the hierarchical modulation constellation. At act 950, the hierarchically modulated first and second channels are conveyed. In an aspect, the first and second channels are conveyed in a single carrier. It is to be noted that modulation of information bits of first and second channel through hierarchical modulation constellation ensures that communication can be effected through a single carrier.

FIG. 10 is a flowchart of an example method for configuring a set of hierarchic weights according to aspects of the subject innovation described herein. At act 1010, a set of hierarchic weights (e.g., $\alpha_B$ and $\alpha_E$), or energy ratios, is configured. Such configuration can be implemented on a per-terminal basis, a per-flow basis, or a per-subscriber basis. Hierarchic weights can be determined based at least in part on (1) QoS specifications such as GBR, ABR, BER, PER, BLER, traffic handling priority which typically determines scheduling priorities—generally dictated by channel quality indicators in a served mobile station; and (2) user equipment capabilities or mode of operation. It should be appreciated that other sources, metrics, or parameters can also be utilized to determine hierarchic weights, or energy ratios. In an aspect, configuration of hierarchic weights or energy ratios can be autonomously and dynamically adjusted in response to changes in aforementioned sources (1) or (2), like changes in scheduled mode of operation of a device; e.g., a mobile station switches from SIMO operation to MIMO operation. At act 1020, a first weight in the configured set of hierarchic weights is assigned to a first encoded constellation and a second weight in the configured set of hierarchic weights is assigned to the second encoded constellation. At act 1030, a set of configured hierarchic weights is retained. In an aspect, hierarchic weights can be stored in a memory on the network device configuring the hierarchic weights. At act 1030, a configured hierarchic weight is conveyed.

FIG. 11 presents a flowchart of an example method for decoding information bits of a first and second channels hierarchically modulated. At act 1110, a first and second channels that are hierarchically modulated in a first and a second layers are received (see FIGS. 3A and 3B for an illustration of a layered coding structure). The first and second channels can be substantially any traffic or control channels in a system that effects a wireless communication. At act 1120, the first layer associated with information bits of the first channel is decoded. It is to be noted that first layer do not carry information bits of second channel. At act 1130, the second layer associated with information bits in the second channel is decoded. In view of the layered coding of the received bit stream, e.g., first and second channels modulated hierarchically, the second layer can be decoded through (i) parallel decoding with the first layer, wherein for example LLRs are computed for all constellation points; or (ii) serial decoding in which exploits knowledge of the bit mapping structure: Decoded bits from base layer are cancelled from soft symbols and LLRs are computed from enhancement layer constellation points.

Next, systems that can enable aspects of the disclosed subject matter are described in connection with FIGS. 12 and 13. Such systems can include functional blocks, which can be functional blocks that represent functions implemented by a processor or an electronic machine, software, or combination thereof (e.g., firmware).

Figure 12:
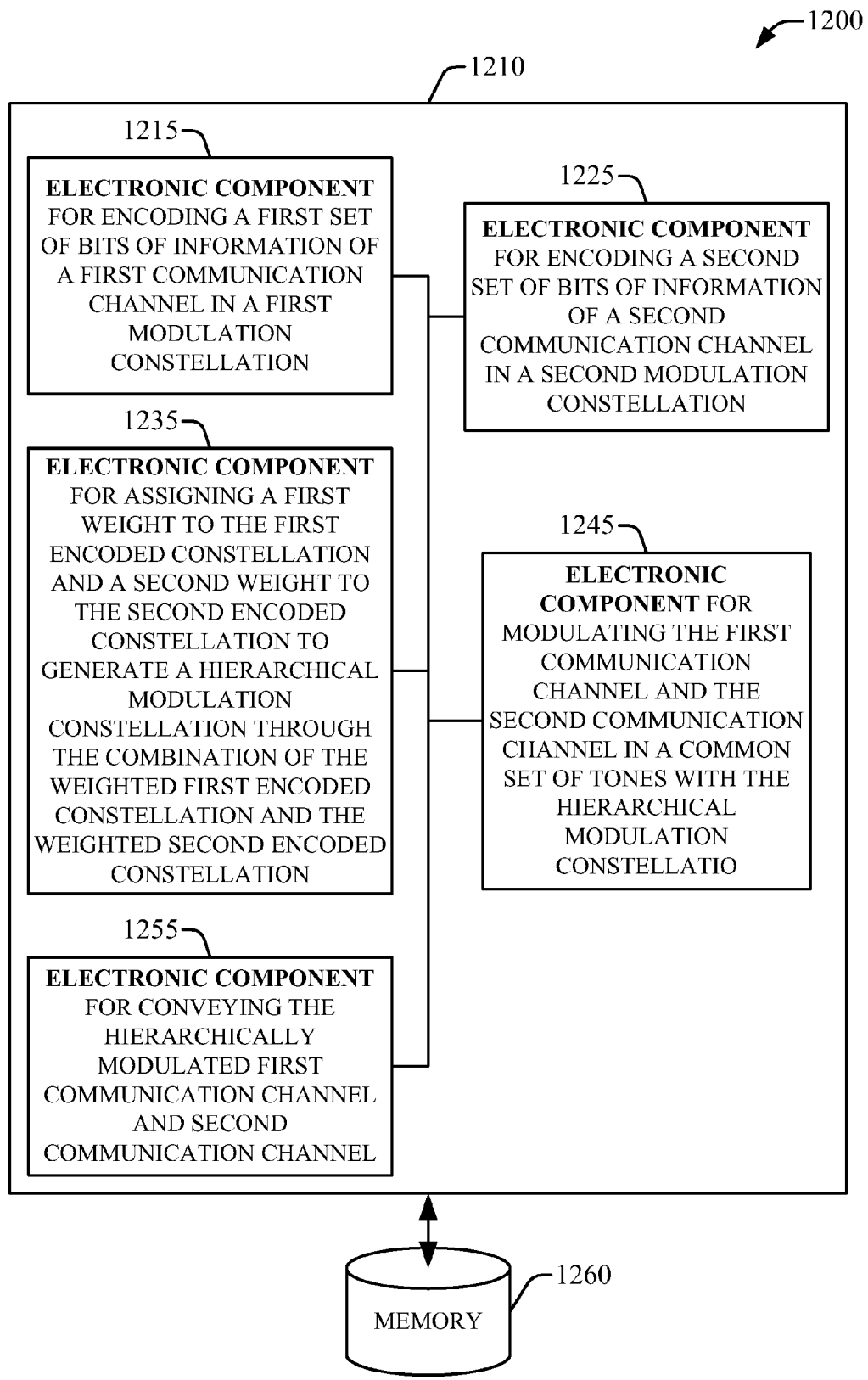
FIG. 12 illustrates a block diagram of an example system that enables hierarchical modulation and utilization thereof in accordance with aspects disclosed in the subject specification.

FIG. 12 illustrates a block diagram of an example system 1200 that enables hierarchical modulation and utilization thereof in accordance with aspects disclosed in the subject specification. System 1200 can reside, at least partially, within a mobile (e.g., access terminal 210). System 1200 includes a logical grouping 1210 of electronic components that can act in conjunction. In an aspect of the subject innovation, logical grouping 1210 includes an electronic component 1215 for encoding a first set of bits of information of a first communication channel in a first modulation constellation; an electronic component 1225 for encoding a second set of bits of information of a second communication channel in a second modulation constellation; and an electronic component 1235 for assigning a first weight to the first encoded constellation and a second weight to the second encoded constellation to generate a hierarchical modulation constellation through the combination of the weighted first encoded constellation and the weighted second encoded constellation. In addition, system 1200 can include electronic component 1245 for modulating the first communication channel and the second communication channel in a common set of tones with the hierarchical modulation constellation, and a component 1255 for conveying the hierarchically modulated first communication channel and second communication channel.

System 1200 can also include a memory 1250 that retains instructions for executing functions associated with electrical components 1215, 1225, 1235, 1245 and 1255, as well as measured or computed data that may be generated during executing such functions. While shown as being external to memory 1260, it is to be understood that one or more of electronic components 1215, 1225, 1235, 1245, and 1255, and can exist within memory 1260.

Figure 13:
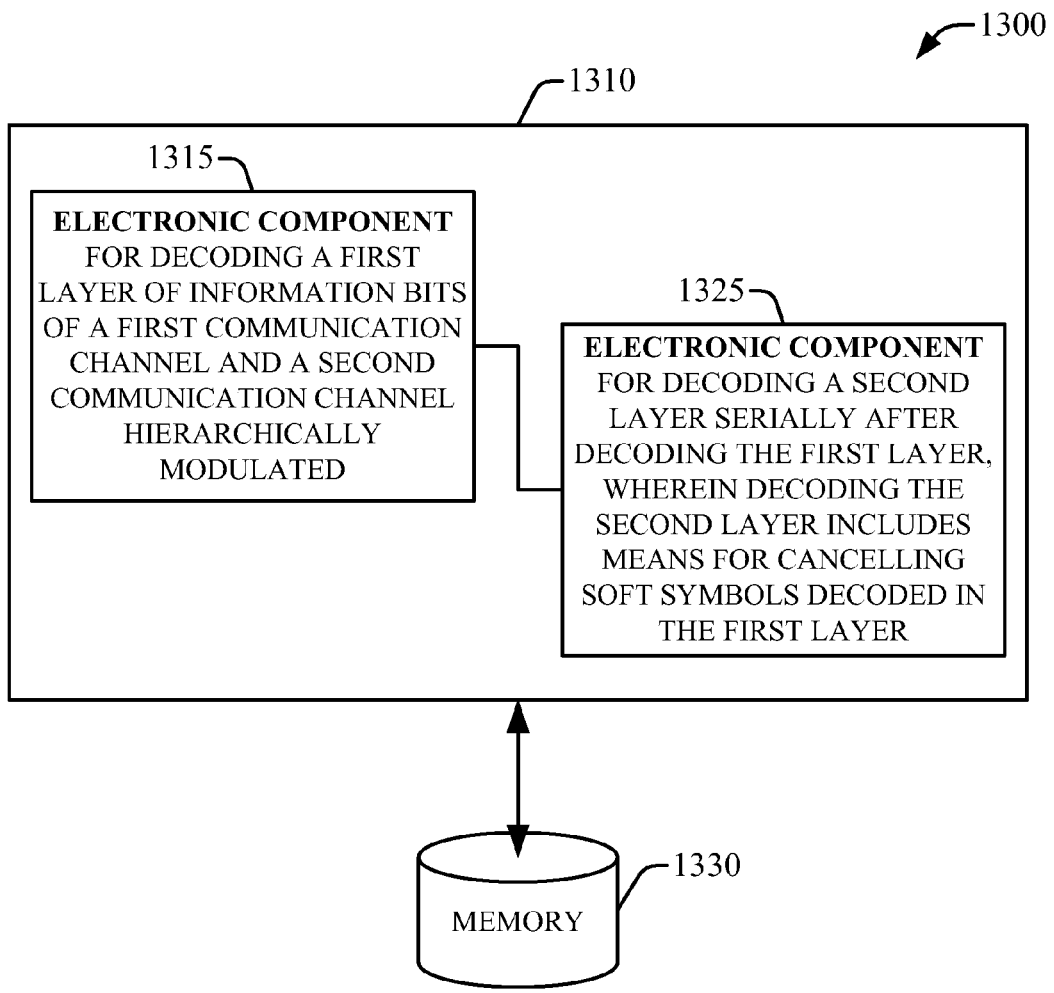
FIG. 13 illustrates a block diagram of an example system that enables to decode hierarchically modulated channels in accordance with aspect described in the subject specification.

FIG. 13 illustrates a block diagram of an example system 1300 that enables to decode hierarchically modulated channels in accordance with aspect described in the subject specification. System 1300 can reside, at least partially, within a mobile (e.g., access terminal 240). System 1300 includes a logical grouping 1310 of electronic components that can act in conjunction. In an aspect of the subject innovation, logical grouping 1310 includes an electronic component 1315 for decoding a first layer of information bits of a first communication channel and a second communication channel hierarchically modulated; and an electronic component 1325 for decoding a second layer serially after decoding the first layer, wherein decoding the second layer includes means for cancelling soft symbols decoded in the first layer.

System 1300 can also include a memory 1330 that retains instructions for executing functions associated with electrical components 1315 and 1325, as well as measured or computed data that may be generated during executing such functions. While shown as being external to memory 1330, it is to be understood that one or more of electronic components 1315 and 1325, and can exist within memory 1330.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method employed in a wireless communication system, the method comprising:
    encoding P bits (P a positive integer) of information of a first communication channel in a first modulation constellation;

encoding Q bits (Q a positive integer) of information of a second communication channel in a second modulation constellation;

combining the encoded first modulation constellation and the encoded second modulation constellation to generate a hierarchical modulation constellation, wherein combining includes configuring a set of weights and assigning a first weight in the configured set of weights to the first encoded constellation and a second weight in the configured set of weights to the second encoded constellation, wherein the first weight (α) and the second weight (β) are configurable through a configurable control parameter (ε); and modulating the first communication channel and the second communication channel in a common set of tones with the hierarchical modulation constellation.

2. The method of claim 1, the configurable control parameter determines an erasure rate of at least one of the encoded P bits of information of the first communication channel or the encoded Q bits of information of the second communication channel.

3. The method of claim 2, wherein configuring a set of weights further comprises optimizing the configurable control parameter to determine a relative erasure rate among the first communication channel and the second communication channel that optimizes at least one of a quality of service.

4. The method of claim 3, wherein the first weight, the second weight, and the control parameter satisfy the condition $$\varepsilon = \frac{\alpha^2}{\beta^2}.$$

5. The method of claim 4, wherein one of the first weight or the second weight equals $$\sqrt{\frac{\varepsilon}{1+\varepsilon}}.$$

6. The method of claim 1, wherein the first communication channel is one of an ACK (acknowledge) channel, or an NACK (not-acknowledge) channel, and the second communication channel is a CQI (channel quality indication) channel.

7. The method of claim 1, wherein the first communication channel is one of an RI (rank indication) channel or a PMI (precoding matrix indicator channel), and the second communication channel is a CQI (channel quality indication) channel.

8. The method of claim 1, further comprising conveying the hierarchically modulated first communication channel and second communication channel.

9. The method of claim 1, further comprising storing the set of configured weights.

10. The method of claim 1, wherein each of the first modulation constellation or the second modulation constellation is at least one of a binary phase-shift keying modulation (BPSK), a quadrature phase-shift keying (QPSK) modulation, a quadrature amplitude modulation (QAM), M-ary QAM (M-QAM), with M a positive integer.

11. A wireless communication device comprising:

a processor configured:

to encode P bits (P a positive integer) of information of a first communication channel in a first modulation constellation; to encode Q bits (Q a positive integer) of information of a second communication channel in a second modulation constellation;

to assign a first weight (α) to the first encoded constellation and a second weight (β) to the second encoded constellation to generate a hierarchical modulation constellation through the combination of the weighted first encoded constellation and the weighted second encoded constellation, wherein the first weight (α) and the second weight (β) are configurable through a configurable control parameter (ε); and to modulate the first communication channel and the second communication channel in a common set of tones with the hierarchical modulation constellation; and a memory coupled to the processor.

12. The wireless communication device of claim 11, the configurable control parameter determines an erasure rate of at least one of the encoded P bit of information of the first communication channel or the encoded Q bits of information of the second communication channel.

13. The wireless communication device of claim 12, further comprising conveying the hierarchically modulated first communication channel and second communication channel.

14. The wireless communication device of claim 13, wherein the first communication channel is one of an RI (rank indication) channel or a PMI (precoding matrix indicator channel), and the second communication channel is a CQI (channel quality indication) channel.

15. The wireless communication device of claim 13, wherein each of the first modulation constellation or the second modulation constellation is at least one of a binary phase-shift keying modulation (BPSK), a quadrature phase-shift keying (QPSK) modulation, a quadrature amplitude modulation (QAM), M-ary QAM (M-QAM), with M a positive integer.

16. The wireless communication device of claim 12, wherein the memory retains the first weight and the second weight.

17. The wireless communication device of claim 16, wherein the memory further stores at least one of a set of first constellations, a set of second constellations, and a set of hierarchical constellations.

18. The wireless communication device of claim 11, wherein the first weight, the second weight, and the control parameter satisfy the condition $$\varepsilon = \frac{\alpha^2}{\beta^2}.$$

19. The wireless communication device of claim 18, wherein one of the first weight or the second weight equals $$\sqrt{\frac{\varepsilon}{1+\varepsilon}}.$$

20. An apparatus that operates in a wireless communication environment, the apparatus comprising:
- means for encoding a first set of bits of information of a first communication channel in a first modulation constellation;
- means for encoding a second set of bits of information of a second communication channel in a second modulation constellation;
- means for assigning a first weight ($\alpha$) to the first encoded constellation and a second weight ($\beta$) to the second encoded constellation to generate a hierarchical modulation constellation through the combination of the weighted first encoded constellation and the weighted second encoded constellation, wherein the first weight ($\alpha$) and the second weight ($\beta$) are configurable through a configurable control parameter ($\epsilon$);
- means for modulating the first communication channel and the second communication channel in a common set of tones with the hierarchical modulation constellation; and
- means for conveying the hierarchically modulated first communication channel and second communication channel.

21. The apparatus of claim 20, wherein the first weight ($\alpha$), the second weight ($\beta$), and the control parameter ($\epsilon$) satisfy the condition $$\varepsilon = \frac{\alpha^2}{\beta^2}.$$

22. The apparatus of claim 21, wherein the configurable control parameter determines an erasure rate of at least one of the encoded first set of bits of information of the first communication channel or the encoded second set of bits of information of the second communication channel.

23. The apparatus of claim 22, wherein the first set comprises 2 bits and the second set comprises 2 bits.

24. A computer program product comprising a non-transitory computer-readable medium including:
- code for causing at least one computer to encode P bits (P a positive integer) of a first communication channel in a first layer of a modulation constellation symbol;
- code for causing at least one computer to encode Q bits (Q a positive integer) of a second communication channel in a second layer of a modulation constellation symbol;
- code for causing at least one computer to generate a hierarchical modulation constellation symbol through a weighted combination of the encoded first layer of a modulation constellation symbol and the encoded second layer of a modulation constellation, wherein the code for causing at least one computer to generate the hierarchical modulation constellation comprises code for causing the at least one computer to configure a set of weights, and code for causing the at least one computer to assign a first weight in the configured set of weights to the encoded first layer of a modulation constellation symbol and a second weight in the configured set of weights to the encoded second layer of a modulation constellation symbol, wherein the first weight ($\alpha$) and the second weight ($\beta$) are configurable through a configurable control parameter ($\epsilon$); and
- code for causing at least one computer to modulate the first communication channel and the second communication channel in a common set of tones with a set of hierarchical modulation constellation symbols.

25. The computer program product of claim 24, the configurable control parameter determines an erasure rate of at least one of the encoded P bit of information of the first communication channel or the encoded Q bits of information of the second communication channel.

26. The computer program product of claim 25, wherein the first weight, the second weight, and the control parameter satisfy the condition $$\varepsilon = \frac{\alpha^2}{\beta^2}.$$

27. The computer program product of claim 26, wherein one of the first weight or the second weight equals $$\sqrt{\frac{\varepsilon}{1+\varepsilon}}.$$

28. The computer program product of claim 27, wherein the first communication channel is one of an ACK (acknowledge) channel, or a NACK (not-acknowledge) channel, and the second communication channel is a CQI (channel quality indication) channel.

29. The computer program product of claim 27, wherein the first communication channel is one of an RI (rank indication) channel or a PMI (precoding matrix indicator channel), and the second communication channel is a CQI (channel quality indication) channel.

* * * * *